(12) United States Patent
Umapathi et al.

(10) Patent No.: US 10,850,272 B2
(45) Date of Patent: Dec. 1, 2020

(54) METHODS AND APPARATUS FOR PROCESSING DROPLETS

(71) Applicant: Massachusetts Institute of Technology, Cambridge, MA (US)

(72) Inventors: Udayan Umapathi, RR Nagar (IN); Patrick Shin, Cambridge, MA (US); Hiroshi Ishii, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 227 days.

(21) Appl. No.: 15/969,641

(22) Filed: May 2, 2018

(65) Prior Publication Data

US 2018/0318826 A1 Nov. 8, 2018

Related U.S. Application Data

(60) Provisional application No. 62/501,419, filed on May 4, 2017.

(51) Int. Cl.
*B01L 3/02* (2006.01)
*G01N 35/10* (2006.01)
(Continued)

(52) U.S. Cl.
CPC ....... *B01L 3/0268* (2013.01); *B01L 3/502792* (2013.01); *B29C 64/112* (2017.08); *B33Y 10/00* (2014.12); *G01N 35/0099* (2013.01); *G01N 35/1011* (2013.01); *B01L 2200/0647* (2013.01); *B01L 2400/0427* (2013.01); *B01L 2400/0457* (2013.01)

(58) Field of Classification Search
CPC ............. B01L 3/0268; B01L 3/502792; B01L 2400/0457; B01L 2200/0647; B01L 2400/0427; B33Y 10/00; B29C 64/112; G01N 35/1011; G01N 35/0099
See application file for complete search history.

(56) References Cited

U.S. PATENT DOCUMENTS

| 2003/0164295 A1 | 9/2003 | Sterling |
| 2004/0058450 A1 | 3/2004 | Pamula et al. |

(Continued)

OTHER PUBLICATIONS

Abdelgawad, M., et al., All-terrain droplet actuation; published in Lab on a Chip, Lab Chip, 2008, 8, pp. 672-677, Apr. 2008.

(Continued)

*Primary Examiner* — J. Christopher Ball
(74) *Attorney, Agent, or Firm* — Stephen R. Otis

(57) ABSTRACT

An electrowetting-on-dielectric actuator may include an array of electrodes and a dielectric layer. The actuator may modulate voltage of the electrodes in such a way that time-varying electric fields created by the electrodes cause droplets of liquid to move relative to the actuator. The electric fields may cause the droplets to press up against a bottom surface of the actuator while the droplets are under and touching the bottom surface. The droplets may then be released from the bottom surface and thereby deposited on an object being fabricated. The release of droplets may be repeated, one layer of droplets at a time, to fabricate the object. Multiple actuators may simultaneously organize droplets in layers. A robot may move the actuators, one at a time, into position for releasing the droplets.

7 Claims, 18 Drawing Sheets

(51) Int. Cl.
*G01N 35/00* (2006.01)
*B01L 3/00* (2006.01)
*B33Y 10/00* (2015.01)
*B29C 64/112* (2017.01)

(56) References Cited

U.S. PATENT DOCUMENTS

2004/0151828 A1  8/2004  Zribi
2006/0146099 A1* 7/2006  Wang .................. B41J 2/005
                                                   347/75
2010/0194408 A1  8/2010  Sturmer et al.
2011/0076734 A1  3/2011  Zhou et al.

OTHER PUBLICATIONS

Chang, J., et al., Simplified ground-type single-plate electrowetting device for droplet transport; published in Journal of Electrical Engineering and Technology, 6(3), 402-407, year 2011.

Gong, J., et al., Direct-Referencing Two-Dimensional-Array Digital Microfluidics Using Multilayer Printed Circuit Board; published in Journal of Microelectromechanical Systems, vol. 17, Issue 2, Apr. 2008.

Hadwen, B., et al., Programmable large area digital microfluidic array with integrated droplet sensing for bioassay; published in Lab on a Chip, 12(18), pp. 3305-13, year 2012.

Hong, J., et al., Three-dimensional digital microfluidic manipulation of droplets in oil medium; published in Scientific Reports, Jun. 25, 2015.

Im, M., et al., Adhesion Force Change by Electrowetting on a Polymer Microlens Array; published in Journal Journal of Adhesion Science and Technology, vol. 26, 2012—Issue 12-17: Electrowetting.

Lee, S., et al., Droplet jumping by electrowetting and its application to the three-dimensional digital microfluidics; published in Applied Physics Letters, 100, 081604, Feb. 2012.

Lienemann, J., et al., EDEW Version 1.0, A simulation tool for fluid handling by electrowetting effects; published Jan. 2004.

Li, Y., et al., A Low-Cost and High-Resolution Droplet Position Detector for an Intelligent Electrowetting on Dielectric Device; published in Journal of Laboratory Automation 2015, vol. 20(6) 663-669.

Nelson, W., et al., Droplet Actuation by Electrowetting-on-Dielectric (EWOD): A Review; published in Journal of Adhesion Science and Technology, vol. 26, 2012—Issue 12-17: Electrowetting; pp. 1747-1771.

Park, J., et al., Fast and reliable droplet transport on single-plate electrowetting on dielectrics using nonfloating switching method; published in Biomicrofluidics, vol. 4, Issue 2, year 2010.

Samad, M., et al., Design and Fabrication of an Electrode for Low-actuation-Voltage Electrowetting-on-Dielectric Devices; published in Procedia Technology, vol. 20, 2015, pp. 20-25, year 2015.

Sohail, S., et al., Electrowetting-On-Dielectric Induced Droplet Actuation in M×N Array of Electrode; published in Proceedings of the COMSOL 2011 Conference in Bangalore, India, year 2011.

Vo, X., et al., Transient electrowetting on dielectric for activating droplets in bioprinting applications; published in Proceedings of the 2nd International Conference on Progress in Additive Manufacturing (Pro-AM 2016), year 2016.

Yi, U., et al., Characterization of electrowetting actuation on addressable single-side coplanar electrodes; published in Journal of Micromechanics and Microengineering, vol. 16, No. 10, year 2006.

Zhao, Y., et al., Fundamentals and applications of electrowetting: A critical review; published in Rev. Adhesion Adhesives, vol. 1, No. 1, Feb. 2013.

Zhou, J., et al., Electrowetting-based multi-microfluidics array printing of high resolution tissue construct with embedded cells and growth factors; published in Virtual and Physical Prototyping, vol. 2, 2007—Issue 4, year 2007.

* cited by examiner

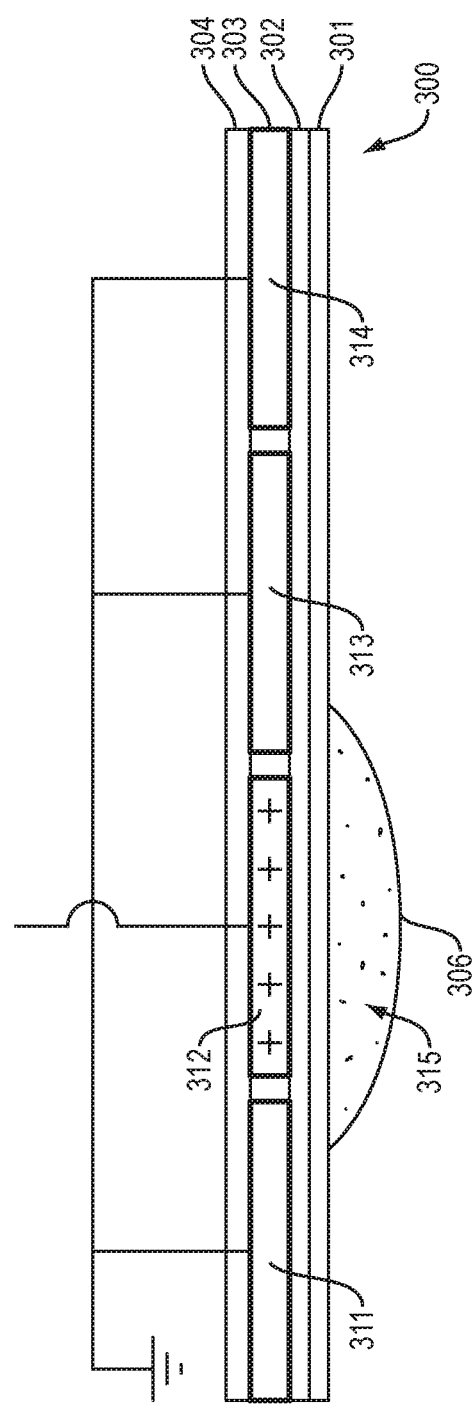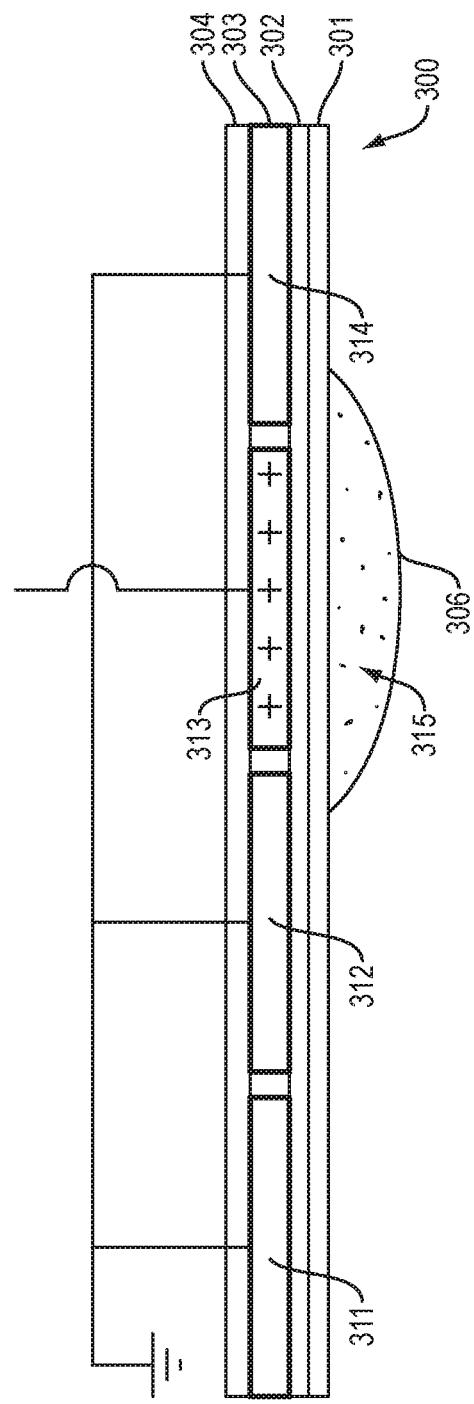

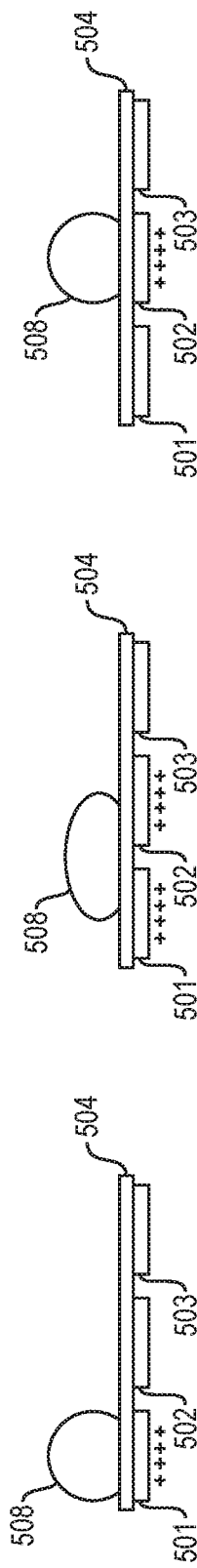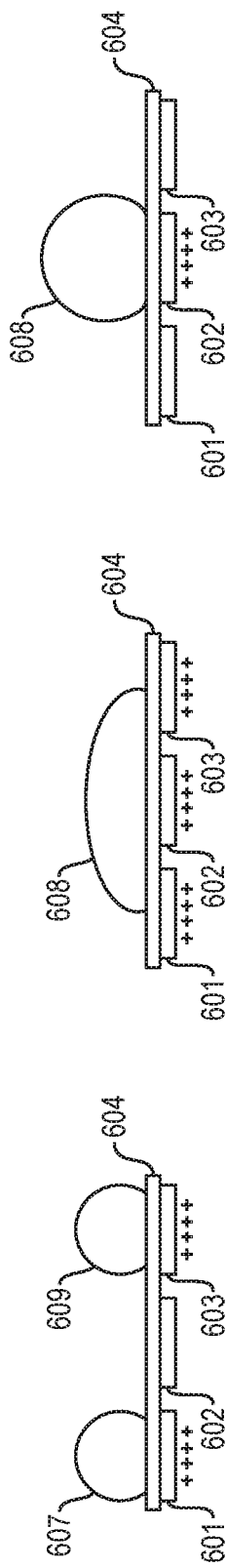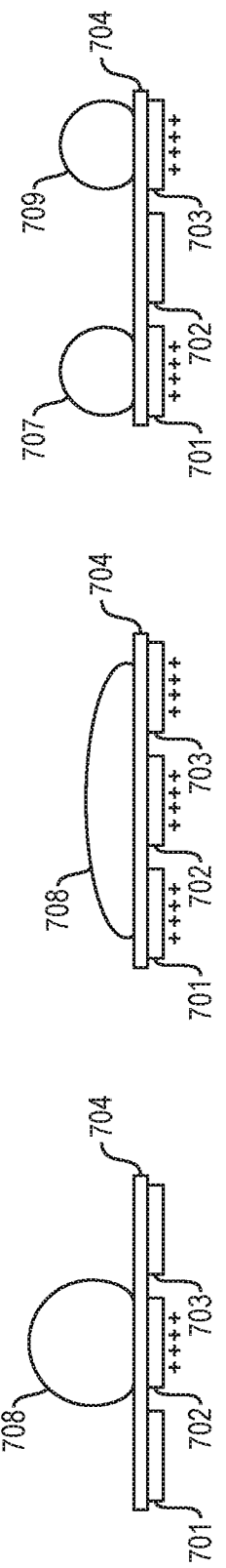

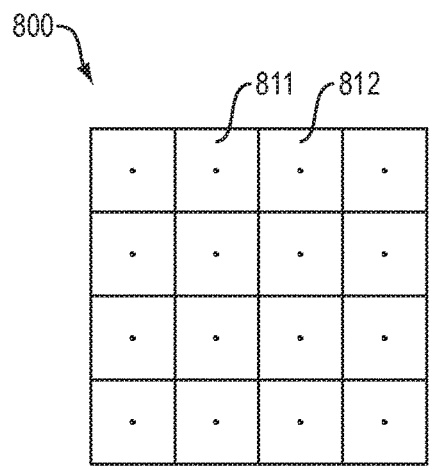
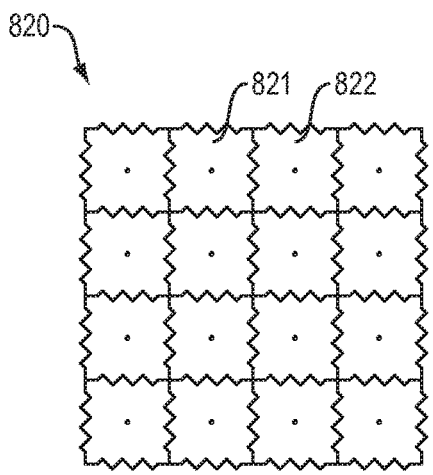
FIG. 8A
FIG. 8B
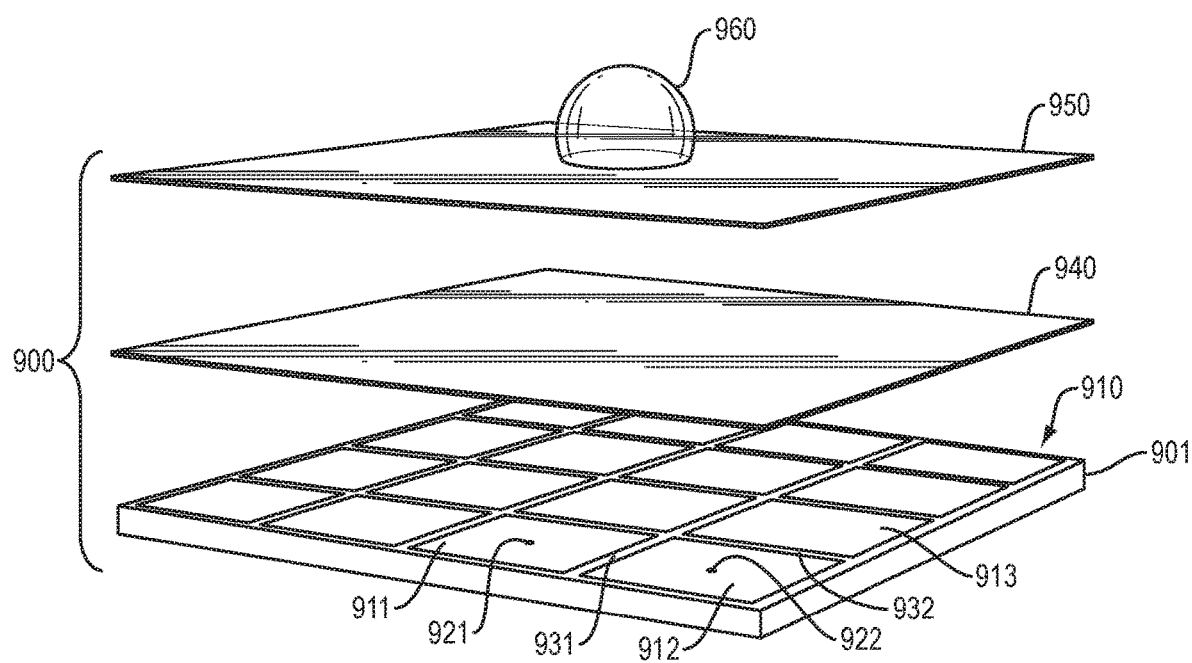
FIG. 9

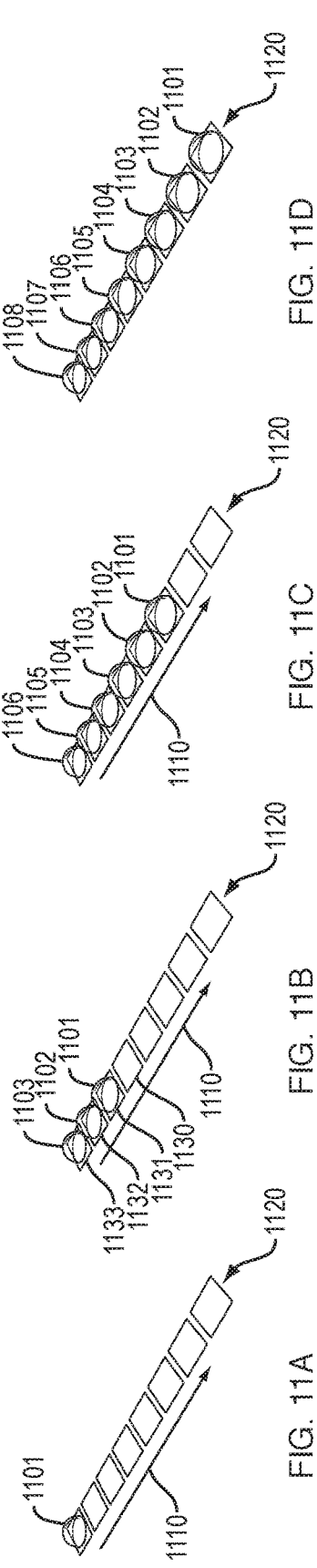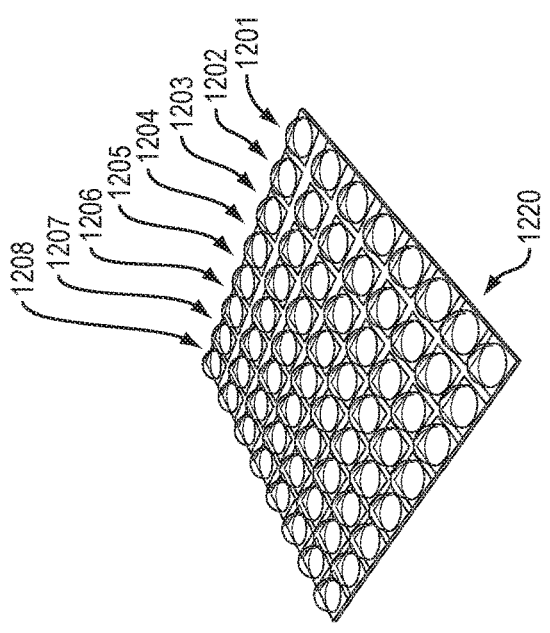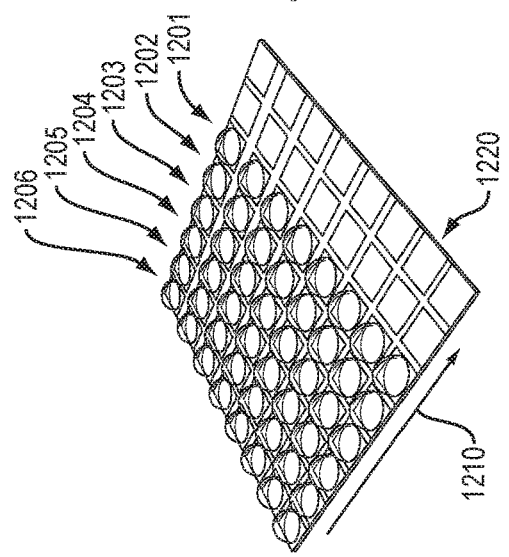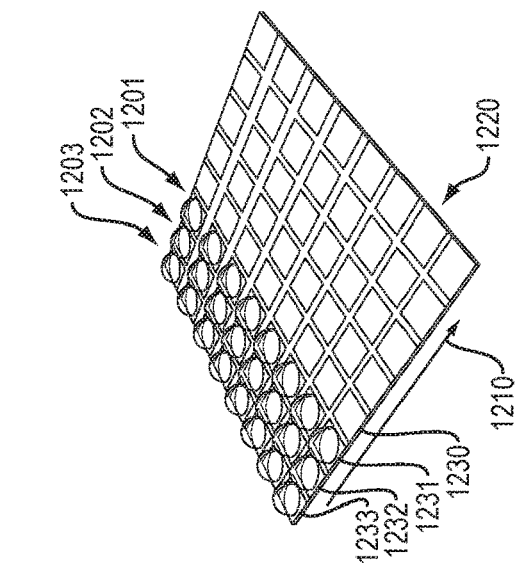

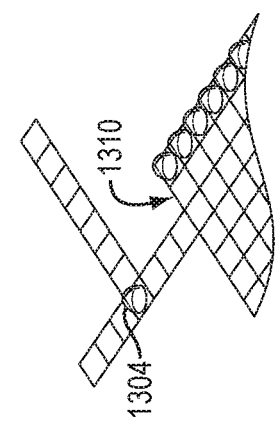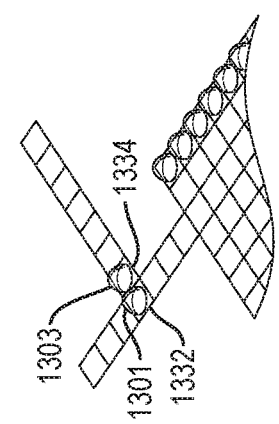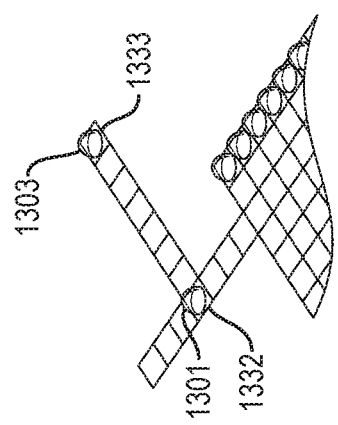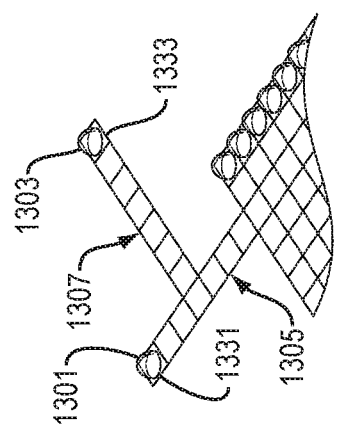

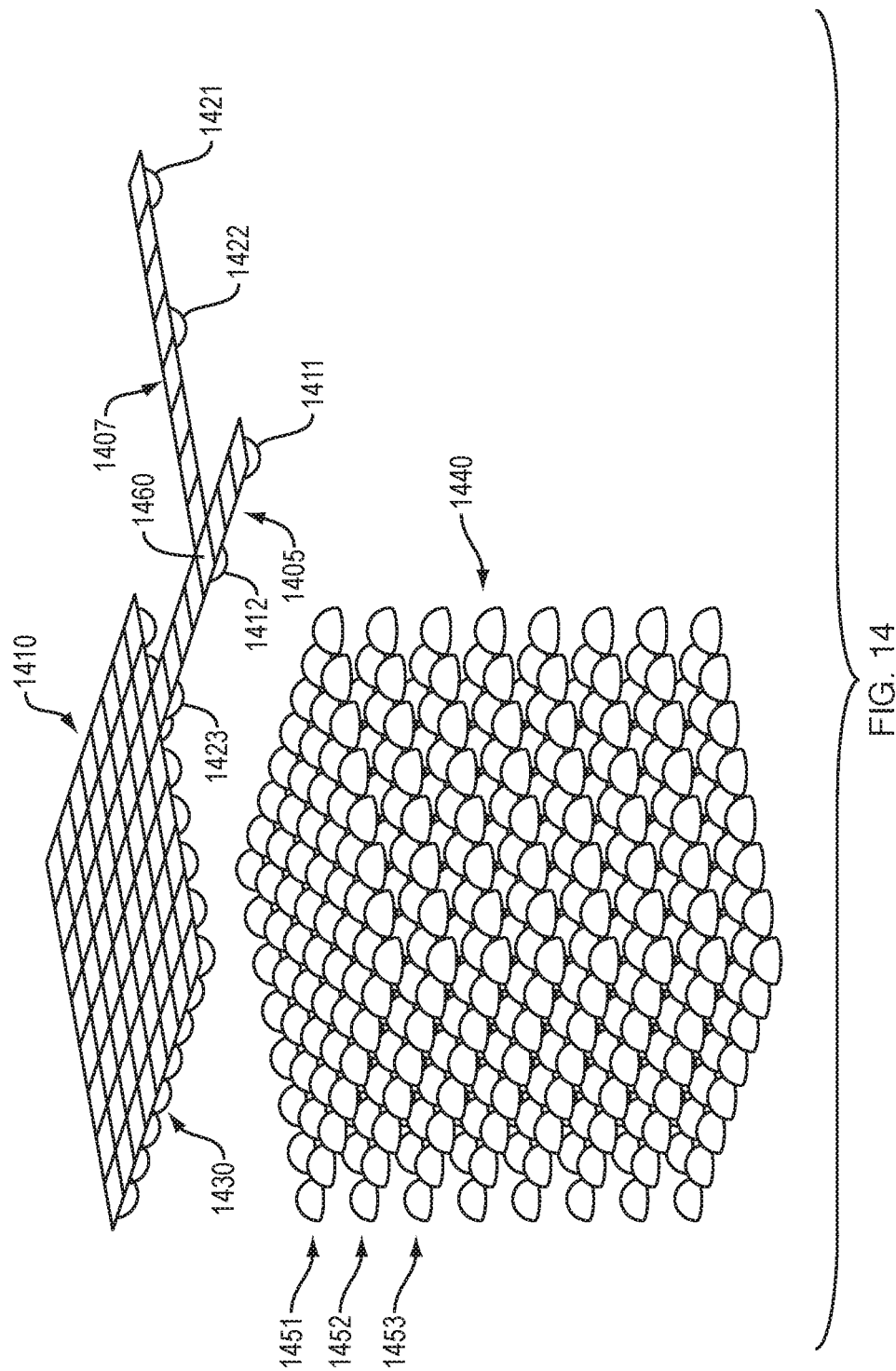

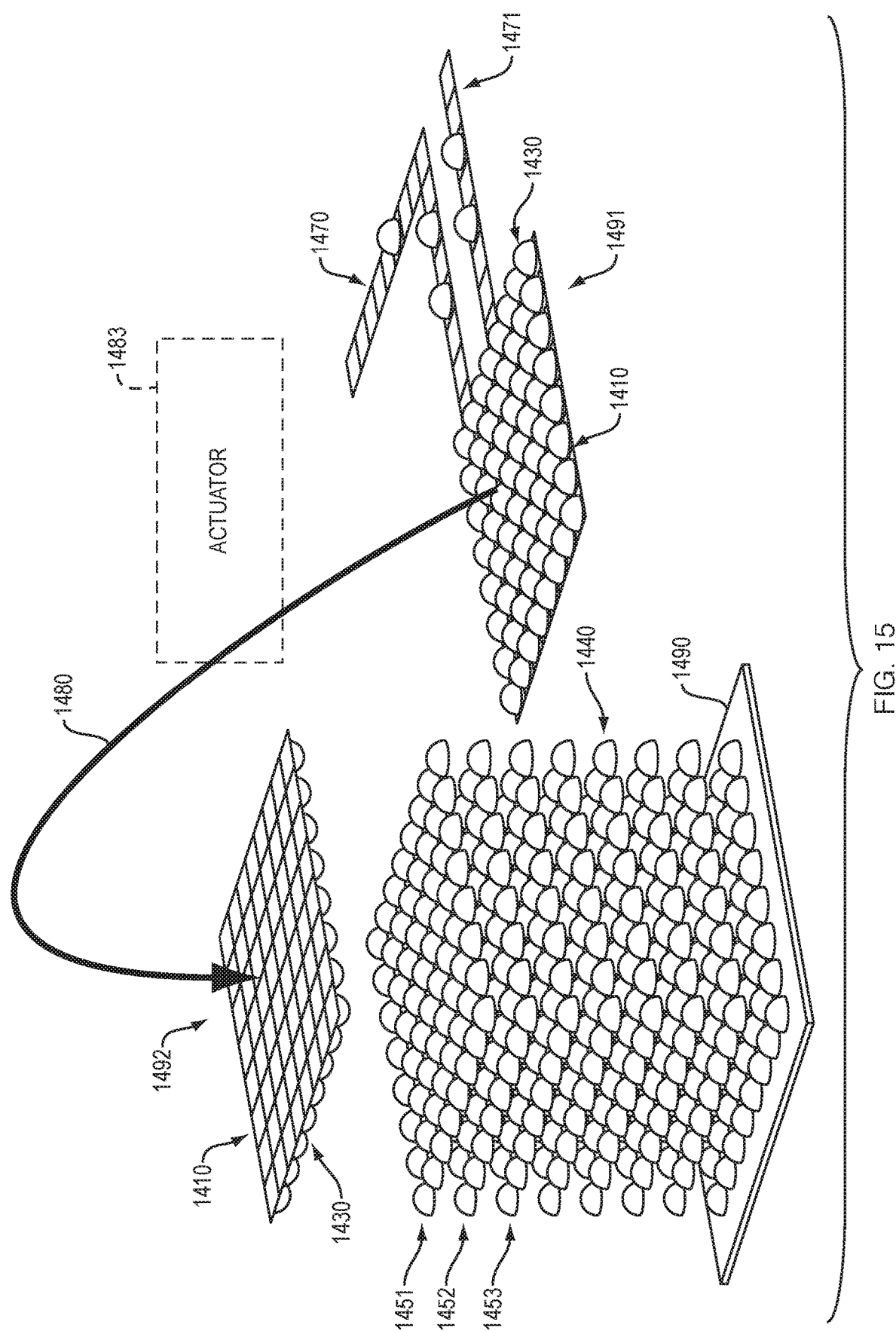

METHODS AND APPARATUS FOR PROCESSING DROPLETS

RELATED APPLICATIONS

This application claims the benefit of U.S. Provisional Application No. 62/501,419 filed May 4, 2017 (the "Provisional").

FIELD OF TECHNOLOGY

The present invention relates generally to processing of droplets.

BACKGROUND

In electrowetting-on-dielectric (EWOD) methods, the wettability of a droplet of liquid that is touching or adjacent to a dielectric film may be modulated by varying an electric field across the dielectric film. This in turn may modulate the shape of the droplet. By changing the shape of droplets, EWOD may cause the droplets to move, merge or split. The electric field may be modulated by applying voltages to electrodes.

The wettability of a droplet on a solid surface surrounded by air is governed by interfacial tension between the solid, liquid and gas medium. For an immobile droplet, the wettability is measured in terms of the contact angle with the solid surface, which is governed by Young's equation:

$$\gamma_{SL} = \gamma_{SG} + \gamma_{LG} \cos \theta_e \quad \text{(Equation 1)}$$

where $\gamma_{SL}$ is the solid-liquid surface tension, $\gamma_{LG}$ is the liquid-air surface tension, $\gamma_{SG}$ the solid-gas surface tension, and $\theta_e$ is the contact angle under equilibrium.

Electro-capillarity is described by the Lippmann-Young equation:

$$\cos\theta_v = \cos\theta_0 + \frac{1}{\gamma_{LG}} \frac{1}{2} c V^2 \quad \text{(Equation 2)}$$

where $\theta_0$ is the contact angle when the electric field is zero (i.e. no voltage applied) and $\theta_v$ is the contact angle when a voltage V is applied, and c is the capacitance per unit area between the electrode and the droplet.

In EWOD technology, applying an electric field to a droplet may change the contact angle between the droplet and a surface that the droplet is touching. This in turn may cause the droplet to change shape, to move, to split into smaller droplets, or to merge with another droplet.

SUMMARY

In illustrative implementations of this invention, EWOD (electrowetting-on-dielectric) actuation of droplets is employed to rapidly and repeatedly organize layers of droplets and then deposit them to fabricate a 3D object.

In some implementations of this invention, the EWOD actuation has one or more of the following nine features that facilitate rapid organization and deposition of droplets.

First, droplets may be organized as a layer on the underside of an EWOD plate. For instance, an EWOD plate may create electric fields that transport droplets while the droplets are underneath, and touching the bottom side, of the plate. This transportation may organize the droplets in a desired pattern underneath the plate. Positive voltages in electrodes in the plate may cause the droplets to electrowet in such a way that the droplets press up against the bottom side of the EWOD plate.

Second, after the droplets are organized as a layer of droplets underneath and touching the bottom side of an EWOD plate, the electric fields that are holding the droplets up against the bottom of the plate may be turned off (e.g., by turning off positive voltages in electrodes in the plate). This in turn may cause the droplets to be released from the bottom of the EWOD plate and to be deposited on a 3D object being fabricated.

Third, droplets may instead be organized while above, and touching the top layer of, an EWOD plate. In that case: (a) after the droplets are organized in a layer on top of the EWOD plate, the plate may be turned over while the plate creates electric fields that hold the layer of droplets substantially stationary relative to the plate; and (b) turning the plate over may cause droplets that were above and touching the plate to instead be underneath and touching the plate. After the plate is turned over (causing the layer of droplets to be underneath and touching the bottom side of the plate), electric fields created by the plate may be turned off, causing the layer of droplets to be released and deposited on a 3D object being fabricated.

Fourth, each EWOD plate may have an "open" configuration in which droplets touch only one surface (top or bottom) of the plate, instead of having a "two-plate" configuration in which droplets are sandwiched between two plates. This open configuration may facilitate releasing a layer of droplets that are touching the plate.

Fifth, each EWOD plate may precisely control the volume of the droplets in such a way that the droplets are sufficiently small (e.g., in the picoliter range) to be held up against the bottom of the plate by electrowetting. For instance, the EWOD plate may precisely split a larger droplet into two smaller droplets, in order to reduce the size of droplets. When a droplet is sufficiently small (e.g., in the picoliter range), interfacial forces in the droplet (that are caused by electric fields created by an EWOD plate) may be much greater than gravitational force exerted on the droplet. The strong interfacial forces created by electrowetting may press droplets up against the bottom side of an EWOD plate, thereby allowing droplets to be organized into a single layer while underneath and touching the bottom side of the plate.

Sixth, the EWOD plate may include an array of many (e.g., more than 1000) electrodes arranged in rows and columns. This array of electrodes may create electric fields that move droplets along the rows or columns of electrodes, in such a way that the movement organizes the droplets into a layer of droplets that are arranged in rows and columns and that are touching the EWOD plate.

Seventh, parallel assembly of droplets may be performed, to increase the rate of deposition of droplets and thus increase the rate of fabrication of a 3D object. In some cases, parallel assembly is performed with a robot (or other actuator) that picks up the EWOD plates and carries the plates into position for deposition of droplets. In this Pick and Place Robot approach, droplets may be simultaneously moved on (or underneath) multiple EWOD plates in order to organize a layer of droplets on (or under) each of the plates. A robot (or other actuator): (a) may pick up an EWOD plate after a layer of droplets has been organized on or under that plate; (b) may move that plate to a position over a build platform; and (c) if the droplets have been organized on the top of the plate, may turn the plate over. While the EWOD plate is over the build platform, droplets that are touching the bottom side of the plate may be released to fabricate a 3D object. In some cases, parallel assembly may be achieved within each EWOD plate by simultaneously moving multiple droplets on the plate. For instance, for each EWOD plate, droplets may be moved simultaneously along multiple columns (or multiple rows) of electrodes of the plate, in a manner that is loosely analogous to moving bits of data along multiple parallel shift registers.

Eighth, each EWOD plate may actuate movement of small droplets at high speeds on a smooth surface of the EWOD plate, in order to rapidly organize droplets in a layer touching the plate, before the droplets are deposited. For instance, in some cases, the EWOD plates may actuate motion of the droplets at 200 mm/s or more.

Ninth, EWOD plates may create a layer of droplets in which the material composition of in each droplet is individually controlled. This in turn may facilitate precise fabrication (by deposition of droplets) of a multi-material 3D object. For example, an EWOD plate may create a material gradient in a layer of droplets that are touching the plate. The material composition of the droplets may be controlled, on a droplet-by-droplet basis, in many ways. For instance, a single layer of droplets that is on or under an EWOD plate may comprise droplets from different liquid reservoirs that contain different materials. Furthermore, the EWOD plate may merge droplets that contain different materials in order to mix the materials. By precisely controlling the relative sizes of the droplets being merged, the EWOD plate may control the relative proportions of materials being mixed together as a result of the merger of the droplets. In some cases, the material in a droplet may be produced by a chemical reaction that occurs after droplets containing different materials are merged (thereby causing the materials to mix and initiating the chemical reaction).

In illustrative implementations of this invention, a wide variety of multi-material objects may be fabricated by deposition of droplets. For instance, deposition of droplets from EWOD plates may be employed to fabricate electronics, mechanical structures (e.g., trusses, cellular lattices, meta-materials), or biological materials (e.g., tissues). As a non-limiting example, deposition of droplets from one or more EWOD plates may fabricate (e.g., at the micron scale) fully-functional electromechanical components.

In some implementations of this invention, microfluidic processes may occur on an EWOD plate as very small droplets are rapidly moved and mixed while touching the EWOD plate. For instance, biological materials in tiny (e.g., in a range from 10 picoliter to 100 picoliter) droplets may be precisely moved and mixed by EWOD actuation. This "microfluidics-on-EWOD" approach may be employed instead of a conventional microfluidic device with tubes, valves and pumps.

In some implementations of this invention, EWOD actuated motion and mixing of droplets may replace conventional pipetting.

In some implementations, a capacitive sensor detects the position of each individual droplet on an EWOD plate. Data from the capacitive sensor may be employed as feedback when controlling movement of droplets. Furthermore, the capacitive sensor may detect a human finger touching an EWOD plate or touching a droplet on the plate.

In some implementations, EWOD actuation transports and mixes different colored droplets to create a color palette of different colored paints.

This invention is not limited to horizontal movement of droplets. In some implementations, EWOD actuation actuate vertical movement of droplets (e.g., straight up or down, or up and down along a slanted incline).

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

In FIGS. 2A and 2B, the droplet is above an EWOD plate.

FIGS. 3A and 3B illustrate movement of a droplet in response to a change in electric potential. In FIGS. 3A and 3B, the droplet is below an EWOD plate.

FIGS. 5A, 5B and 5C illustrate translation of a droplet

FIGS. 6A, 6B and 6C illustrate merging two droplets.

FIGS. 7A, 7B and 7C illustrate splitting a droplet into two droplets.

FIGS. 8A and 8B each illustrate an array of electrodes employed for EWOD. In FIG. 8A, the electrodes have straight edges. In FIG. 8B, the electrodes have serrated edges.

FIG. 9 shows an exploded view of an EWOD plate and a droplet resting on it.

FIGS. 11A, 11B, 11C, and 11D show droplets shifting position in a 1D "shift register".

FIGS. 12A, 12B, and 12C show droplets shifting position in a 2D "shift register".

FIGS. 13A, 13B, 13C, and 13D show droplets being mixed, before being moved into position on an EWOD plate.

FIG. 14 shows droplets being moved into position under an EWOD plate and then deposited to form a 3D object.

FIG. 15 illustrates moving an EWOD plate.

Figure 1:
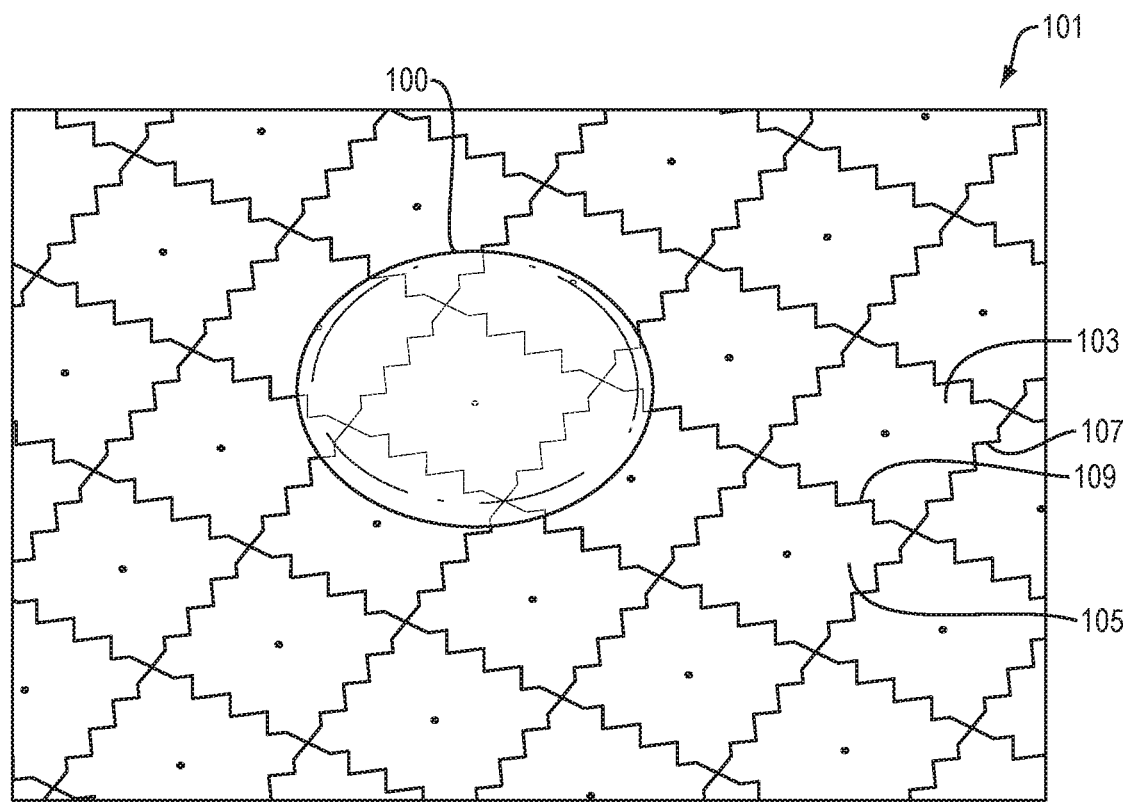
FIG. 1 shows a droplet on an EWOD plate.

The above Figures show some illustrative implementations of this invention. The examples shown in the above Figures do not limit this invention. This invention may be implemented in many other ways.

DETAILED DESCRIPTION

EWOD Control of Droplets

In illustrative implementations of this invention, the technique of electrowetting-on-dielectric (EWOD) is employed. A droplet composed of polarizable liquid may change its shape when a voltage is applied across it. Through this electrowetting, an aqueous droplet may be selectively pulled towards a positive electrode with increased wettability.

In illustrative implementations of this invention, a computer controls voltage in an array of electrodes in an EWOD plate and thereby controls electric fields created by the electrodes. By varying these electric fields, the EWOD plate repeatedly changes the shape of droplets and moves droplets across a surface. This EWOD technique enables a set of primitive operations, such as precisely translating, morphing, merging, and splitting multiple droplets simultaneously. These primitive operations may, in turn, be employed to mix materials in different droplets and to organize droplets in a layer before depositing the layer on a 3D object being fabricated.

In EWOD: (a) a dielectric layer may be located between the electrodes and the droplet; and (b) in many cases, a hydrophobic layer may be located between the dielectric layer and the droplet. Alternatively, in some cases, the dielectric layer itself is strongly hydrophobic and a separate hydrophobic layer is not employed.

The following use scenario illustrates how EWOD may be applied to control the shape of a droplet. In this use scenario: (a) an EWOD plate includes (from bottom to top) a substrate, an array of electrodes, a dielectric layer and a hydrophobic layer; (b) a droplet is on top of, and touching, the hydrophobic layer; and (c) the droplet is located directly above only one specific electrode in an array of electrodes in the EWOD plate and is not directly over other electrodes in the array. In this use scenario, if all of the electrodes are grounded, then the droplet may tend to be repelled by the hydrophobic surface and may tend to be rounder, and the contact angle (between the droplet and the hydrophobic surface) may be large. If a positive voltage is then applied to the specific electrode and the other electrodes remain grounded, then the droplet may "wet in", causing the droplet to flatten and causing the contact angle to become smaller. If the positive voltage is then turned off (so that all of the electrodes in the array are grounded), then: (a) the droplet may again become rounder due to being repelled by the hydrophobic layer; and (b) the contact angle may increase.

A sufficiently strong electric field may cause a single droplet to spread across an entire electrode. For instance, the electric field may be created by applying a positive voltage to the electrode, and by causing neighboring electrodes (or other neighboring nodes) to have a lower voltage (e.g., to be grounded). Applying a positive voltage to multiple electrodes may cause a single droplet to be stretched across them. Removing the positive voltage may cause a droplet to become rounder (more pushed out from a hydrophobic surface) and to cover less electrodes. By controlling spreading of a droplet, the shape of a droplet may be controlled.

FIG. 1 shows a droplet on an EWOD plate, in an illustrative implementation of this invention.

In FIG. 1, EWOD plate 101 includes an array of square electrodes (e.g., electrodes 103, 105). The electrodes (e.g., 103, 105) each have serrated edges (e.g., 107, 109). EWOD plate 101 is configured to move droplets by changing voltages of the electrodes. FIG. 1 shows droplet 100 at a time when droplet 100 is located above four electrodes and is primarily located over a single electrode.

Figure 2A:
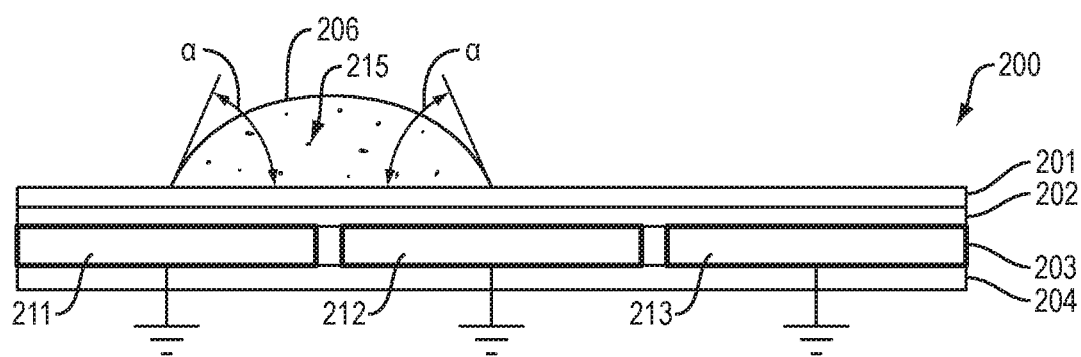
FIGS. 2A and 2B illustrate movement of a droplet in response to a change in electric potential.
Figure 2B:
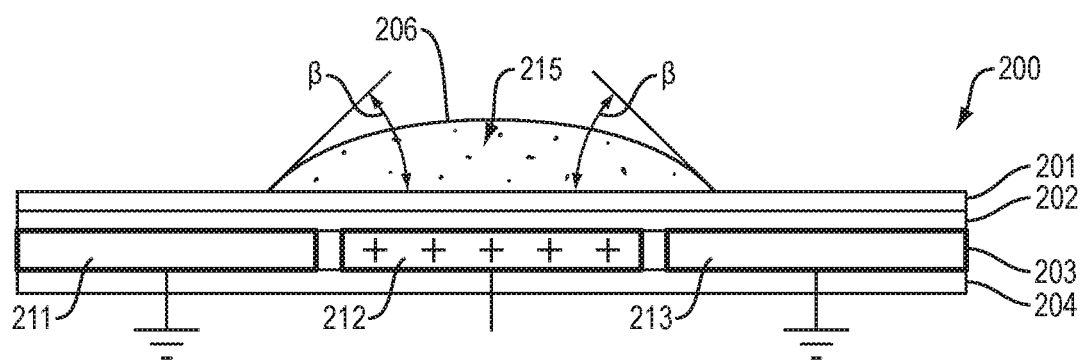

FIGS. 2A and 2B illustrate movement of a droplet in response to a change in electric potential, in an illustrative implementation of this invention. FIGS. 2A and 2B show a temporal sequence, with FIGS. 2A and 2B being the first and the last, respectively, in the sequence.

In FIGS. 2A and 2B, droplet 206 is located above EWOD plate 200. The EWOD plate 200 includes a substrate layer 204, electrode layer 203, dielectric layer 202 and hydrophobic layer 201. Droplet 206 is touching hydrophobic layer 201.

In FIG. 2A, electrodes 211, 212, 213 are each connected to ground, and no voltage is being applied to droplet 206. In FIG. 2A, droplet 206 contacts EWOD plate 200 at contact angle $\alpha$.

In FIG. 2B, electrodes 211 and 213 are each connected to ground. In FIG. 2B, electrode 212 has a positive voltage, relative to electrodes 211 and 213. In FIG. 2B, droplet 206 contacts EWOD plate 200 at contact angle $\beta$.

FIG. 2B shows droplet 206 in an equilibrium state after the positive voltage has been applied to electrode 212. In FIG. 2B, the positive voltage at electrode 212 has caused droplet 206 to move (from its position shown in FIG. 2A) to a new position in which the droplet is centered over electrode 212. Due to the applied positive voltage: (a) the contact angle in FIG. 2B is less steep than in FIG. 2A; and (b) droplet 206 is flatter in FIG. 2B than in FIG. 2A. Thus, in FIG. 2B, this applied positive voltage has changed the shape of droplet 206, by causing droplet 206 to have a contact angle of $\beta$, where $\alpha > \beta$. In other words, the positive voltage causes the contact angle to be less steep (than it would be in the absence of the positive voltage).

FIGS. 3A and 3B illustrate movement of a droplet in response to a change in electric potential. FIGS. 3A and 3B show a temporal sequence, with FIG. 3A being the first in the sequence.

In FIGS. 3A and 3B, the droplet is below an EWOD plate. The EWOD plate 300 includes a substrate layer 304, electrode layer 303, dielectric layer 302 and hydrophobic layer 301. Droplet 306 is touching hydrophobic layer 301.

In FIG. 3A, droplet 306 is centered under electrode 312, which has a positive voltage relative to electrodes 311, 313 and 314. In FIG. 3A, electrodes 311, 313 and 314 are each connected to ground.

FIG. 3B shows droplet 306 after it has moved to a new position, in response to a change in voltage. Specifically: (a) electrode 312 had a positive voltage in FIG. 3A and is grounded in FIG. 3B; and (b) electrode 313 was grounded in FIG. 3A and has a positive voltage in FIG. 3B. In FIG. 3B, droplet 306 has moved so that it is now centered under electrode 313. In FIGS. 3A and 3B, droplet 306 is in equilibrium.

In FIGS. 2A-3B, 16 and 21, the hydrophilic layer (e.g., 201, 301, 1601, 2001) may comprise a smooth surface.

In FIGS. 2A-3B and 16, the droplet (e.g., 206, 306, 1615) may contain small particles (e.g., 215, 315), such as cells, cellular fragments, nucleic acids, proteins or molecules (e.g., molecules involved in a polymerase chain reaction or in a chemical reaction). In FIGS. 2A-3B and 16, the droplet (e.g., 206, 306, 1615): (a) may comprise a solution, colloidal suspension, emulsion or mixture; and (b) may include solutes, colloids, suspended matter (e.g., cells or tissue), or immiscible fluids.

Figure 4A:
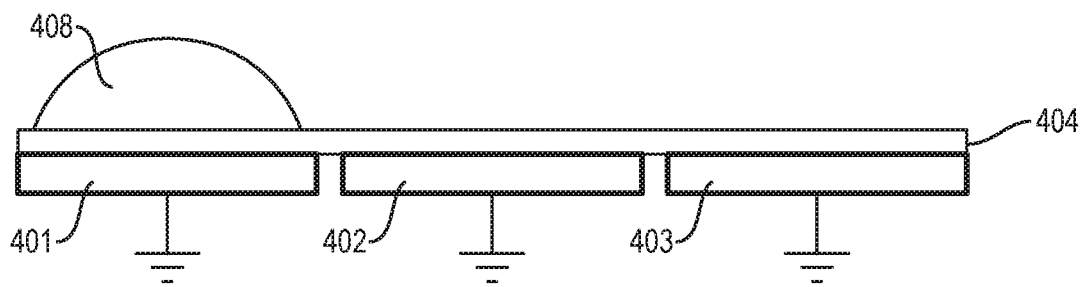
FIGS. 4A, 4B and 4C illustrate an effect of an electric field on a droplet.
Figure 4B:
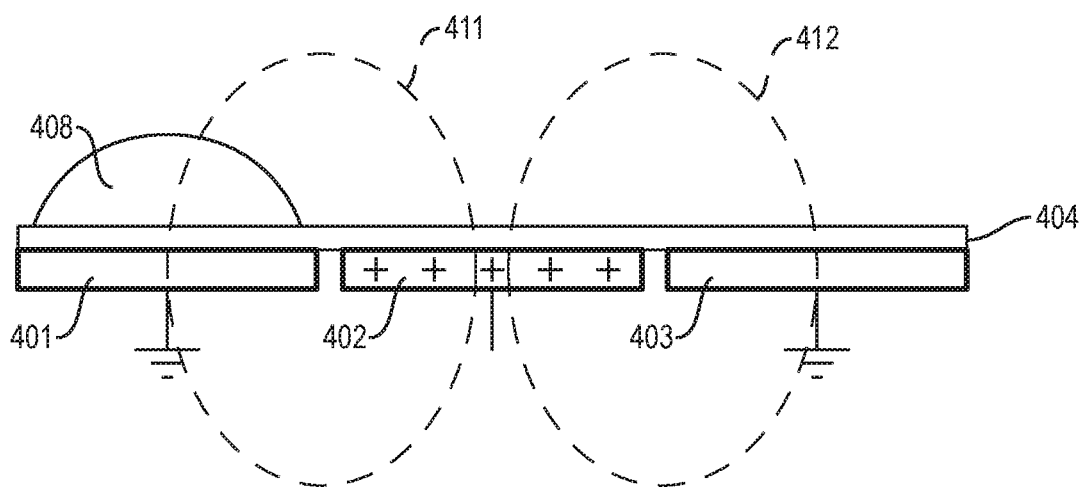
Figure 4C:
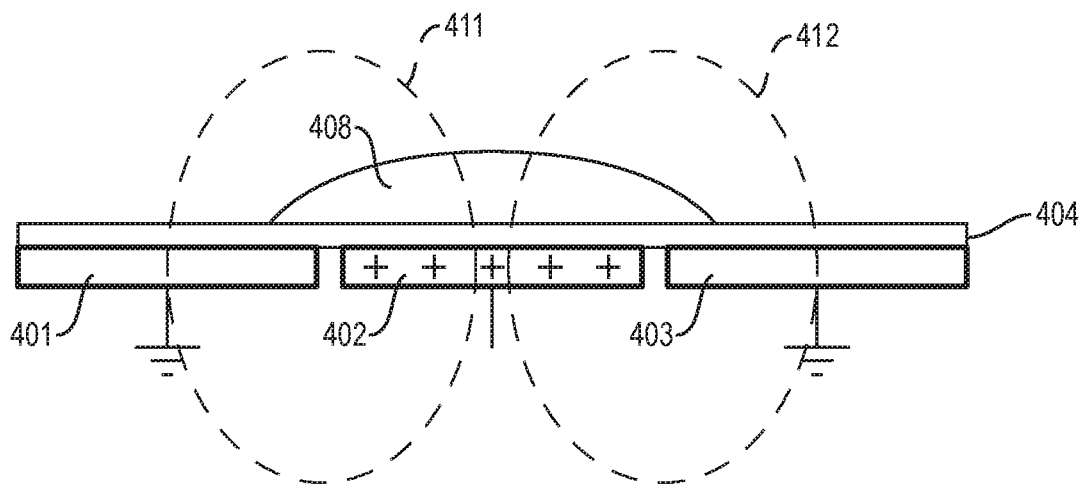

FIGS. 4A, 4B and 4C illustrate an effect of an electric field on a droplet. FIGS. 4A-4C show a temporal sequence, with FIGS. 4A and 4C being the first and the last, respectively, in the sequence.

FIG. 4A shows a droplet 408 before a positive voltage is applied to electrode 402. FIG. 4B shows droplet 408 immediately after a positive voltage is applied to electrode 402. In FIG. 4B, droplet 408 is not in equilibrium. FIG. 4C shows droplet 408 in equilibrium, after the positive voltage is applied to electrode 402.

As shown in FIGS. 4B and 4C, two electrodes that differ in voltage may create an electric field that acts at a distance, causing a droplet to move toward the more positive electrode. In FIGS. 4B and 4C, the difference in voltage between the positive electrode 402 and the grounded electrodes 401, 403 creates an electric field (symbolized by electric field lines 411, 412). This electric field causes droplet 408 to move from a first position in FIG. 4A (where droplet 408 is centered above grounded electrode 401) to a second position in FIG. 4C (where droplet 408 is centered above positive electrode 402). In FIG. 4B, the electric field changes surface tensions in the droplet in such a way as to create a net force that includes a component that is parallel to surface 404 and that pushes droplet 408 laterally nearer to electrode 402. This net force occurs in FIG. 4B even though droplet 408 is not, at the time, touching the portion of surface 404 that is immediately above positive electrode 402.

Drop 408 is flatter (less round) in FIG. 4C than in FIG. 4A. This is because of the positive voltage applied to electrode 402 in FIG. 4C.

Electrodes 401 and 403 are grounded in FIGS. 4A-4C. Electrode 402 is grounded in FIG. 4A and has a positive voltage in FIGS. 4B and 4C.

FIGS. 5A, 5B and 5C illustrate translation of a droplet. The change in location of the positive electrode(s) in these Figures causes droplet 508 to translate laterally across surface 504. FIGS. 5A-5C show a temporal sequence, with FIGS. 5A and 5C being the first and the last, respectively, in the sequence.

In FIG. 5A, electrode 501 has a positive voltage and electrodes 502, 503 are grounded. This causes droplet 508 to be centered over electrode 501.

In FIG. 5B, electrodes 501 and 502 have a positive voltage and electrode 503 is grounded. This causes droplet 508 to spread out and to be centered between electrodes 501 and 502.

In FIG. 5C, electrode 502 has a positive voltage and electrodes 501 and 503 are grounded. This causes droplet 508 to be centered above electrode 502.

When two droplets are pulled towards the same electrode, they may merge due to surface tension. For instance, multiple droplets may merge to create a larger volume droplet spreading across multiple electrodes.

FIGS. 6A, 6B and 6C illustrate merging two droplets. This merging is actuated by changes in voltage of electrodes. FIGS. 6A-6C show a temporal sequence, with FIGS. 6A and 6C being the first and the last, respectively, in the sequence.

In FIG. 6A, electrodes 601 and 603 have a positive voltage and electrode 602 is grounded. This causes droplets 607 and 609 to be centered over electrodes 601 and 603, respectively.

In FIG. 6B, electrodes 601, 602 and 603 have a positive voltage and other nearby electrodes (not shown) are grounded. In FIG. 6B, this has caused droplets 607 and 609 to spread out and merge, thereby forming a larger droplet 608.

In FIG. 6C, electrode 602 has a positive voltage and electrodes 601 and 603 are grounded. This causes droplet 608 to be centered above electrode 602.

A droplet may be split into two smaller ones through a sequence of voltages, applied across multiple electrodes (e.g., at least three) as in FIG. 7B. To do so, a single droplet may be spread across three adjacent electrodes by applying equal voltage to all of them simultaneously. Then the center electrode may be "turned off" (e.g., grounded) thereby causing the droplet to move away from the center electrode. Due to the equal voltage at both neighboring electrodes, the droplet may then split into two smaller droplets.

FIGS. 7A, 7B and 7C illustrate splitting a larger droplet into two smaller droplets. This splitting is actuated by changes in voltage of electrodes. FIGS. 7A-7C show a temporal sequence, with FIGS. 7A and 7C being the first and the last, respectively, in the sequence.

In FIG. 7A, electrode 702 has a positive voltage and electrodes 701 and 703 are grounded. This causes droplet 708 to be centered above electrode 702.

In FIG. 7B, electrodes 701, 702 and 703 have a positive voltage and other nearby electrodes (not shown) are grounded. In FIG. 7B, this has caused droplet 708 to spread out to cover electrodes 701, 702 and 703.

In FIG. 7C, electrodes 701 and 703 have a positive voltage and electrode 702 is grounded. This has caused droplet 708 to split into smaller droplets 707 and 709, which are centered over electrodes 701 and 703, respectively.

At the moments in time shown in FIGS. 4A-4C, 5A-5B, 6A-6C, and 7A-7C, each droplet: (a) is in equilibrium; and (b) rests on a surface. This surface (e.g., 404, 504, 604, 704) may include a dielectric layer and a hydrophobic layer, the latter being closer to the droplet. In other words, the hydrophobic layer may be between the dielectric layer and the droplet. Alternatively, the surface (e.g., 404, 504, 604, 704) may comprise a material (e.g., composite material) that is both a dielectric and hydrophobic.

FIGS. 8A and 8B each illustrate an array of electrodes employed for EWOD. In FIG. 8A, the electrodes (e.g., 811, 812) in array 800 have straight edges. In FIG. 8B, the electrodes (e.g., 821, 822) in array 820 have serrated edges. Advantageously, serrations at the edges of the electrodes may create overlapping electrical fields that facilitate actuation and control of a droplet. The overlapping fields may result in an electric field gradient that generates a force to propel a droplet when voltages in the electrodes are modulated.

The size of the electrodes may vary. For instance, the electrodes may be millimeter-scale. Alternatively, the electrodes (and gaps between them) may be micron-scale. The electrode size may affect the minimum droplet size and the level of control. A finer granularity of electrode may provide a higher resolution for the electric field and may make a seamless transition of droplets possible, but also may result in more complex PCBs (printed circuit boards) and driving circuits.

The electrodes may comprise any type of conductive material, including metal or metal alloy. In some cases, the electrodes comprise a transparent material (e.g., indium tin oxide). In some cases, the electrodes are flexible, including a flexible composite material. For instance, the electrodes may comprise any flexible Pyralux® material, including copper-clad laminate, polymide single sided copper clad laminate, polymide double sided copper clad laminate, or acrylic-based copper clad laminate.

FIG. 9 shows an exploded view of an EWOD plate and a droplet resting on it. In FIG. 9, EWOD plate 900 comprises a substrate 901, an electrode array 910, a dielectric layer 940, and a hydrophobic layer 950. Electrode array 910 includes multiple electrodes (e.g. electrodes 911, 912, 913). Changes in voltage in the electrodes in array 910 create electric fields that cause different regions of plate 900 to be more or less hydrophilic and actuate movement of droplets (e.g., droplet 960) on plate 900.

A wide variety of substrate materials may be employed, in illustrative implementations of this invention. The substrate layer (e.g., 204, 304, 901) may be rigid or flexible, transparent or opaque. For instance, in some cases, the substrate layer (e.g., 204, 304, 901) comprises glass, polyethylene terephthalate (PET), a thermoplastic polymer, Kapton® (that is, poly (4,4'-oxydiphenylene-pyromellitimide)), or FR4. For example, the FR4 material may comprise a material (such as a copper-clad laminate, a glass epoxy, or a glass-reinforced epoxy laminate) that complies with the FR-4 grade as defined by the NEMA LI 1-1998 specification. Advantageously, FR4 may provide a rigid, non-transparent, and flat interaction surface.

A wide variety of dielectric materials may be employed, in illustrative implementations of this invention. For instance, in some cases, the dielectric layer (e.g., 202, 302, 940) comprises low-density polyethylene, polyvinylidene chloride, Saran Wrap™, plastic paraffin, Parafilm® (e.g., Parafilm M), polydimethylsiloxane (PDMS), polytetrafluoroethylene (PTFE), perfluoroalkoxy alkane (PFA), fluorinated ethylene propylene (FEP), polyp-xylylene) polymers (e.g., Parylene® or Parylene® C), Teflon®, or plastic.

In some cases, the dielectric material (e.g., Teflon®)) is itself hydrophobic. In some cases: (a) the dielectric material is itself hydrophobic; and (b) a separate hydrophobic layer (e.g., silicone oil) is also employed. In some cases: (a) the dielectric material is hydrophobic; and (b) a separate hydrophobic layer (e.g., silicone oil) is not used.

A wide variety of hydrophobic materials may be employed, in illustrative implementations of this invention. For instance, the hydrophobic layer (e.g., 201, 301, 950) may comprise: (a) oil (e.g., silicone oil), Teflon®, or Teflon® AF amorphous fluoroplastic; or (b) a self-assembled monolayer (SAM) with low surface energy.

In some implementations of this invention, one or more of the layers (e.g., substrate, electrode layer, dielectric layer or hydrophobic layer) of an EWOD plate are fabricated by conventional methods of fabricating a PCB (printed circuit board) or IC (integrated circuit). For example, one or more of the following methods may be employed to fabricate all or part of an EWOD plate (including the substrate, electrodes, dielectric layer, hydrophobic layer, and conductive routing): vapor deposition, spraying, dip-coating, spin coating, photolithography, masking, etching, cleaning, and doping. Or, for instance, a copper-clad PCB may be laser-cut. In some cases, an EWOD plate is fabricated with multi-layer routing. The multi-layer routing may facilitate applying voltages to separately addressable electrodes in a large 2D grid and may also facilitate capacitive sensing.

In illustrative implementations, an electric field is created between two regions of an EWOD plate, that are nearby each other and that have different voltages. In many cases, this difference in voltage is achieved by applying a positive voltage to a first electrode and grounding a nearby electrical node.

In some implementations: (a) each electrode (e.g., 911, 912, 913), respectively, in an EWOD plate (e.g., 900) is electrically connected to a switch; (b) in one state of the switch, the electrode is grounded; and (b) in another state of the switch, the electrode has, at least at some times, a positive or negative voltage.

In some implementations, for each electrode (e.g., 911, 912, 913), respectively: (a) an additional electric node (e.g. 921, 922, 931, 932) is located in or near—and is insulated from—the electrode; and (b) these additional nodes are (at least at some times) grounded. Here are two non-limiting examples: In a first example, an additional node is located in the horizontal interior of each electrode. For instance: (a) an additional electric node (e.g., 921) may be located at or near the horizontal center of—and may be electrically insulated from—an electrode (e.g., 911); and (b) this additional electric node (e.g., 921) may be (at least at some times) grounded. In a second example, the additional nodes are located between the electrodes. For instance: (a) additional node 931 may be located between—and may be electrically insulated from—electrodes 911 and 912; (b) additional node 932 may be located between—and may be electrically insulated from—electrodes 912 and 913; and (c) the additional nodes (e.g., 931, 932) may be (at least at some times) grounded.

Figure 10A:
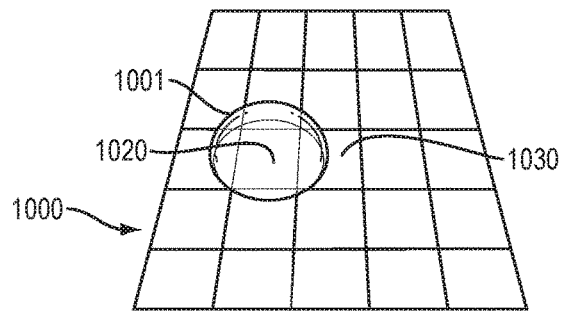
FIGS. 10A, 10B and 10C show a droplet changing shape.
Figure 10D:
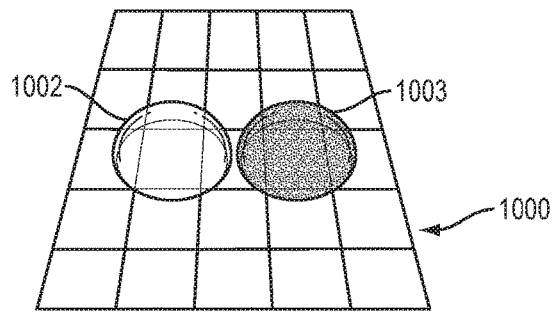
FIGS. 10D, 10E and 10F show droplets merging and their contents mixing.
Figure 10B:
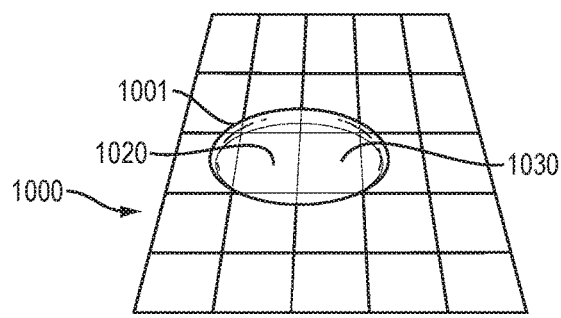
Figure 10E:
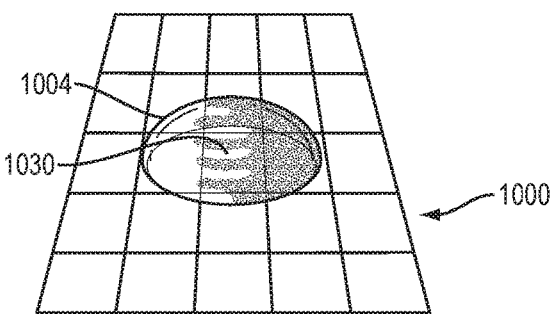
Figure 10C:
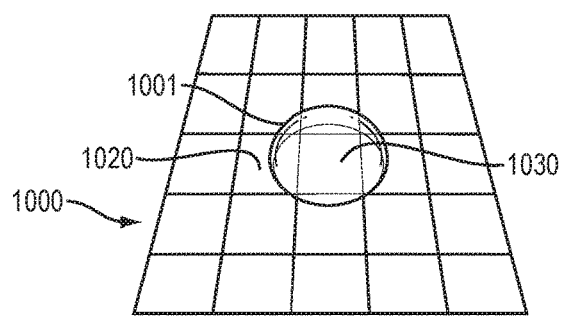

FIGS. 10A, 10B and 10C show a droplet changing shape. FIG. 10A-10C show a temporal sequence; FIGS. 10A and 10C being the first and last, respectively, in the sequence.

Drop 1001 is more rounded in FIG. 10A, then flattens in FIG. 10B, then becomes more rounded again in FIG. 10C. In FIG. 10A, droplet 1001 is centered over electrode 1020 and touches other electrodes (e.g., 1030). In FIG. 10B, droplet 1001 is located primarily over electrodes 1020 and 1030. In FIG. 10C, droplet 1001 is centered over electrode 1030 and touches other electrodes (e.g., 1020). The changes in shape and lateral translation of droplet 1001 that are described in this paragraph may be actuated by changes in voltage applied to the electrodes. Specifically: (a) in FIG. 10A, electrode 1020 may have a positive voltage and surrounding electrodes may be grounded; (b) in FIG. 10B, electrodes 1020 and 1030 may have a positive voltage and surrounding electrodes may be grounded; and (c) in FIG. 10C, electrode 1030 may have a positive voltage and surrounding electrodes may be grounded.

In some cases, rapid switching of electrodes results in oscillating behavior of droplets. For instance, a sequence of voltage changes may be repeated to cause rapid oscillation in the shape of a droplet. In some cases, the rapid oscillation speeds the mixing of contents of a recently merged droplet.

Figure 10F:
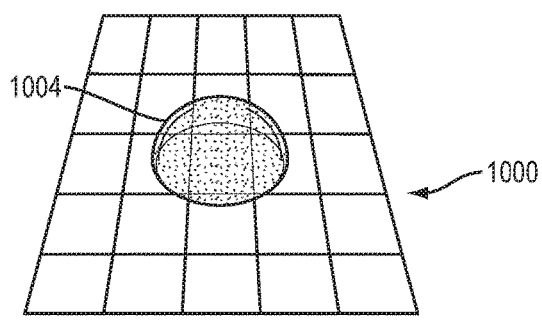

FIGS. 10D, 10E and 10F show droplets merging and their contents mixing. FIGS. 10D-10F show a temporal sequence; FIGS. 10D and 10F being the first and last, respectively, in the sequence.

In FIG. 10D, droplets 1002 and 1003 are separate. In FIG. 10D, the material composition of droplet 1002 is different than that of droplet 1003. For instance, in FIG. 10D, droplet 1002 may contain a different solution, solute, colloid, colloidal suspension, emulsion, mixture, suspended matter (e.g., cells or tissue), or immiscible fluids than does droplet 1003.

In FIG. 10E, positive voltage has been applied to electrode 1030. In FIG. 10E, this positive voltage has caused droplets 1002 and 1003 to merge into droplet 1004 and caused droplet 1040 to be centered over electrode 1030. In FIG. 10E, droplets 1002 and 1003 have only recently merged to form droplet 1004 and the contents of droplet 1004 have not yet fully mixed.

In FIG. 10F, the contents of droplet 1004 have fully mixed.

In FIGS. 10A-10F, the droplets (1001, 1002, 1003, 1004) are on top an EWOD plate 1000 that includes an array of electrodes. Changing the relative voltages applied to different electrodes in the array creates a time-varying electric field that causes droplets located on the EWOD plate to move, merge or split.

3D Printing with Droplets Deposited by One or More EWOD Plates

In some implementations of this invention, one or more EWOD plates are employed to fabricate 3D multi-material structures. The one or more EWOD plates may control the movement, mixing, and deposition of droplets in such a way that the plates deposit layers of droplets to assemble the 3D multi-material structures.

For example, an EWOD plate: (a) may cause droplets to move in such a way that the droplets become precisely organized on a planar surface of the plate; and (b) may alter an electric field to cause the droplets to be simultaneously deposited as a single layer. By repeatedly depositing layers of droplets, a 3D object may be fabricated. The 3D object that is created may be entirely solid or may comprise different materials in different physical states (e.g., may include both solid and liquid materials). In some cases, the droplets include suspended particles that at least partially form the 3D object. Alternatively, the droplets may contain one or more materials that trigger or undergo a chemical reaction. For example, at least a portion of the materials in the droplets may cure or otherwise solidify after the droplets are deposited.

For fabrication of a 3D structure, a "parallel" assembly process may be employed. In the "parallel" process, droplets may be simultaneously organized on multiple EWOD plates. While droplets are being deposited by one EWOD plate, droplets may be being organized on other EWOD plates. After droplets on a given EWOD plate are organized in a desired pattern on the plate, the droplets from that plate may be deposited (on the object being fabricated) and the process of organizing droplets on that plate may begin again. This "parallel" assembly process may greatly increase the rate at which droplets are deposited to fabricate a 3D object.

In some implementations, an EWOD plate may be configured to handle a wide range of sizes of droplets. For instance, in some implementations, the size of droplets that are touching, and actuated by, an EWOD plate may be from 20 µl to 1 ml, including droplets that are 20 mm×20 mm in their x and y dimensions.

In some cases: (a) the size of the droplets is in the picoliter range; and (b) the size of 3D structures that are fabricated by the droplets is extremely small (e.g., in the nanometer, micron or millimeter range A wide variety of materials and particles may be contained (e.g., in a dissolved, suspended or emulsified state) in the droplets or may be created by chemical reactions that occur when droplets are mixed.

A wide variety of types of 3D objects may be created by depositing droplets from one or more EWOD plates. For instance, deposition of droplets from EWOD plates may be employed to fabricate electronics, mechanical structures (e.g., trusses, cellular lattices, meta-materials), or biological materials (e.g., tissues, DNA), to name a few. For a specific use case, deposition of droplets from one or more EWOD plates may fabricate (e.g., at the micron scale) fully-functional electromechanical components.

In some cases, each of the EWOD plates employed for the deposition of droplets comprises electrodes on a single plane with no cover plate. This "open" configuration may facilitate simultaneously adding—or simultaneously removing—a large number of droplets to or from an EWOD plate.

In some cases, the EWOD plates transport, merge and split droplets with great precision. This in turn enables mixing of different materials for variable material properties and geometry, and thus allows precise control of the droplets being deposited. For instance, the EWOD plates may regulate volume of droplets by precisely splitting or merging droplets.

In some cases, the EWOD plates achieve high-speed manipulation of droplets, thereby enabling rapid deposition of droplets to fabricate a 3D object. For instance, in some implementations, an EWOD plate transports macro-scale droplets at 200 mm/s.

When droplets are very small (e.g., at picoliter scale), electric force field may be significantly larger than gravity. In some cases, an inverted EWOD plate (with a hydrophilic layer at the bottom of the plate) may transport small droplets at high speed while the droplets are touching the bottom of the plate and are being pressed against the bottom of the plate due to the electric field.

In some implementations of this invention, micro-scale objects may be picked up and dropped through capillary force enabled droplet grippers. These grippers may pick up prefabricated blocks such as trusses, and micro-electronics.

In some implementations, the EWOD plates are configured to transport droplets linearly along a single column or row of electrodes. In the proposed method, the electrowetting platform is organized to transport droplets linearly on an electrode array. The manner in which droplets are loaded onto or under a single column or row of electrodes may resemble, by rough analogy, the manner in which data bits are serially loaded onto a shift register. An example of this "shift register" loading is shown in FIGS. 11A-11D.

In some implementations of this invention: (a) an EWOD plate may include an array of columns and rows of electrodes; and (b) droplets may be simultaneously loaded onto (or under) multiple rows (or multiple columns) of electrodes in the array. The manner in which droplets are loaded onto or under multiple rows (or multiple columns) of the array at the same time may resemble, by rough analogy, the manner in which data bits may be loaded in parallel unto a 2D register array. An example of this "register array" loading is shown in FIGS. 12A-12C.

In some implementation, a computer: (a) may control the geometry and composition of each voxel making up the 3D object being fabricated; and (b) may (by controlling electric fields created by electrodes) cause droplets made of different materials to be deposited next to each other or mixed before deposition. For instance, the droplets may be mixed before deposition as shown in FIGS. 13A-13D.

Figure 19:
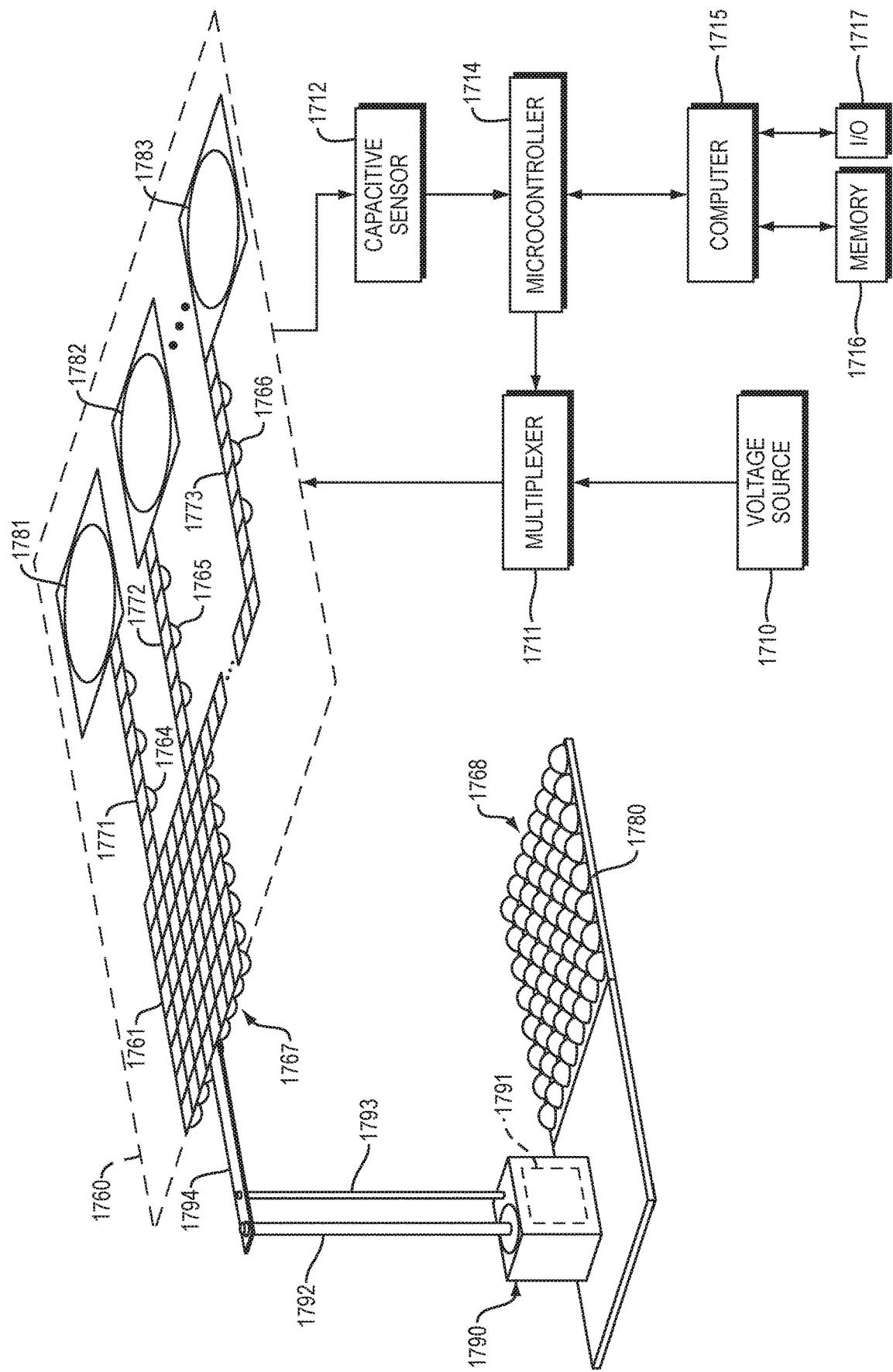
FIG. 19 shows a fabrication system that includes an EWOD plate.

In some implementations: (a) a single EWOD plate is positioned over a build platform; (b) the EWOD plate does not move horizontally relative to the build platform while the 3D object is being fabricated. In this approach (in which a single EWOD plate that does not move horizontally deposits the droplets): (a) the EWOD plate may create electric fields that actuate the movement, merging or splitting of droplets; (b) this movement of droplets may occur while the droplets are under and touching the bottom side of the EWOD plate (due to the electric fields causing the droplets to press up against the bottom of the plate); (c) this movement of droplets may result in the droplets being organized in a single layer while touching the bottom side of the plate; and (d) the EWOD plate may then turn off (or otherwise alter) the electric fields in such a way that the droplets are released (from the plate) as a single layer and are deposited on the 3D object being fabricated. In this approach, the EWOD plate may repeat the process described in the preceding sentence multiple times to organize and deposit multiple layers of droplets, one layer at a time, during fabrication of the 3D object. Examples of this approach are shown in FIGS. 14 and 19. In this approach, droplets may be moved simultaneously along multiple rows or multiple columns of electrodes while touching the bottom of the plate.

Figure 20:
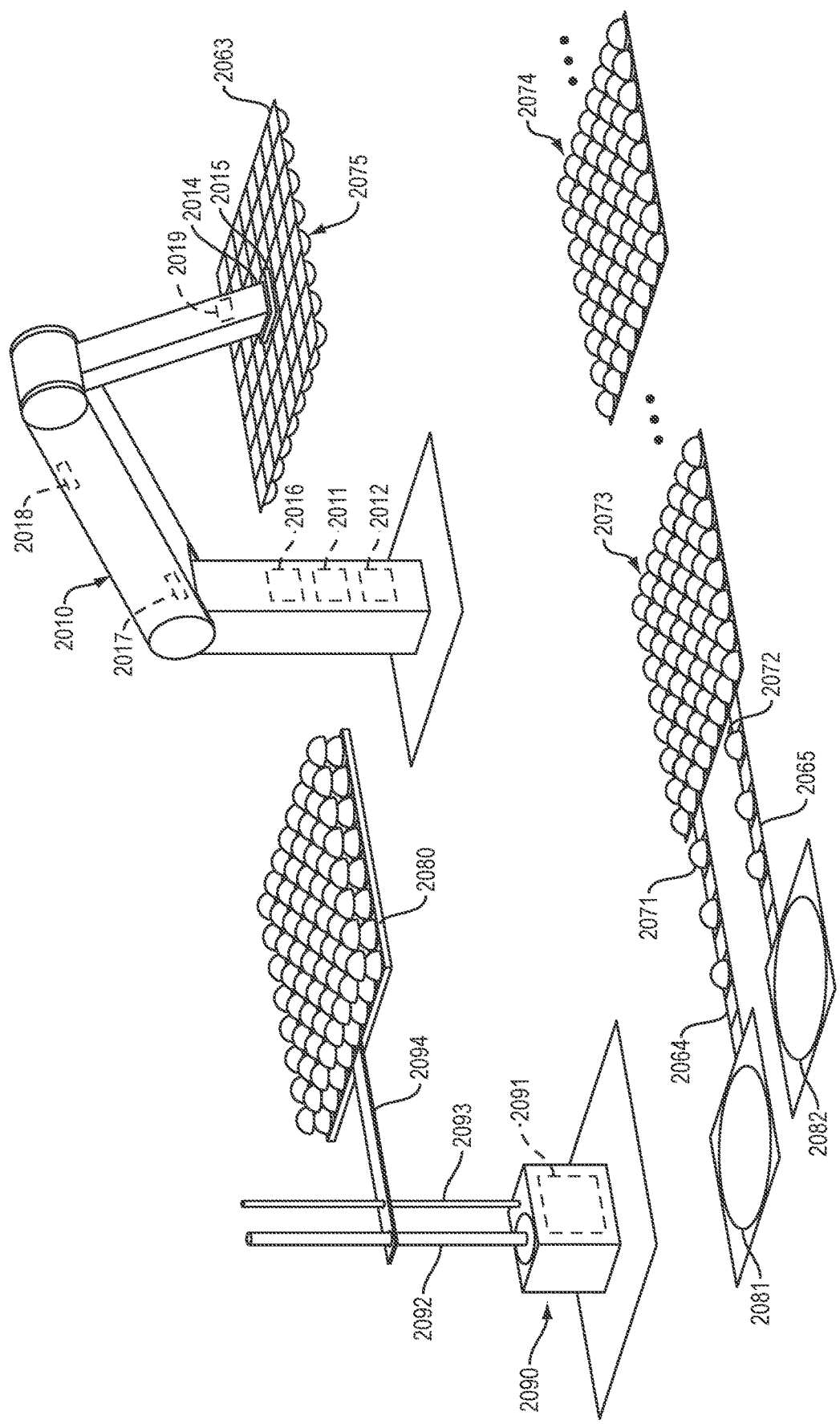
FIGS. 20 and 21 each show a fabrication system that includes a robotic arm that moves an EWOD plate.

Alternatively, a "Droplet Assembler Robot" may organize a layer of droplets on or under each of two or more EWOD plates, respectively. Then a "Pick and Place Robot" may, for each of the EWOD plates, respectively, move the plate to a position over the build platform, where the layer of droplets may be released. In this approach, the Droplet Assembler Robot: (a) may employ EWOD actuation to transport droplets from raw feedstock to each of the two or more EWOD plates, respectively; and (b) may organize the droplets as a layer on or under each of two or more EWOD plates, respectively. The Pick and Place Robot may then pick up one of the EWOD plates (while the layer of droplets is still touching the plate), move it into position over the build platform, and release the layer of droplets. After droplets are released from a given EWOD plate, the Pick and Place Robot may move that plate back to a position in which the Droplet Assembler Robot may load droplets unto or under the plate. These actions by the Pick and Place Robot (which are described in the preceding two sentences) may be repeated for each of the EWOD plates each time that droplets are organized on or under the plate. Repetition of the process described in this paragraph enables rapid, layer-by-layer deposition of droplets. An example of this approach is shown in FIG. 20 (and a similar approach is shown in FIG. 15).

In many cases, it is advantageous to organize droplets as a layer that is under (instead of over) an EWOD plate. This is because, when droplets are organized as a layer that is under (and touching the bottom of) the plate, then the layer may be easily deposited by releasing the droplets. For example: (a) a Droplet Assembler Robot may assemble a layer of droplets that is touching the bottom of an EWOD plate; and (b) a Pick and Place Robot may, without turning the plate over, move the plate to a position where the layer of droplets is released.

In some cases, however, the Droplet Assembler Robot organizes the droplets on top of (instead of under) the EWOD plate. In these cases, the Pick and Place Robot may, before the droplets are released from the plate, turn the plate over, in such a way that: (a) the top layer of the plate becomes the bottom layer of the plate; and (b) the layer of droplets that are touching the top surface of the plate are, after the plate is turned over, touching the bottom of the plate instead. Electric fields created by electrodes in the EWOD plate may cause the layer of droplets to continue to touch the plate while the plate is being turned over and after the plate has been turned over, until the layer of droplets is released from the plate.

In some cases, multiple Droplet Assembler Robots and multiple Pick and Place Robots operate in parallel and thereby speed up the assembly process.

In some cases, the material in droplets organized by the Droplet Assembler Robot is processed before being deposited by the Pick and Place Robot. For instance, the material may be partially bonded or glued together to form a single layer before deposition.

In some use scenarios: (a) immediately before the droplets are released from the plate, the droplets are not in physical contact with the top layer of the 3D object; and (b) thus the droplets fall at least a short distance from the EWOD plate before touching the top layer of the 3D object being fabricated.

Alternatively, in some use scenarios: (a) after a layer of droplets are organized under the EWOD plate, the distance between the EWOD plate and build platform is reduced (by lowering the EWOD plate or raising the build platform) until the layer of droplets (which are still touching the EWOD plate) comes into physical contact with the top layer of the object being fabricated; (b) then the layer of droplets is released from the plate (e.g., by turning off or otherwise altering electric fields that were holding the droplets up against the bottom of the plate); and (c) then the distance between the EWOD plate and build platform is increased (by raising the EWOD plate or lowering the build platform) until the EWOD plate is no longer in contact with the layer of droplets.

FIGS. 11A, 11B, 11C, and 11D show droplets shifting position in a 1D "shift register". FIGS. 11A-11D are in temporal sequence; FIGS. 11A and 11D being the first and last, respectively, in the sequence.

In FIGS. 11A-11D, the droplets (1101, 1102, 1103, 1104, 1105, 1106, 1107, 1108) move in a single direction 1110 in single file along a single path (e.g., a column of electrodes) 1120 for a period of time. In FIGS. 11A-11D, the droplets are actuated to shift position by changing voltage applied to the electrodes.

In some cases, the droplets are sufficiently small so that each droplet covers only one electrode, as shown in FIGS. 11A-11D. In this scenario, the droplets may be actuated to move forward, one droplet at a time, in a temporal sequence, in a manner loosely analogous to a "shift register". For example, in FIG. 11B, droplets 1101, 1102, 1103 may be actuated to move forward as follows: (a) first, make electrode 1130 more positive than electrode 1131, thereby causing droplet 1101 to move from electrode 1131 to electrode 1130; (b) second, make electrode 1131 more positive than electrode 1132, thereby causing droplet 1102 to move from electrode 1132 to electrode 1131; and (c) third, make electrode 1132 more positive than electrode 1133, thereby causing droplet 1103 to move from electrode 1133 to electrode 1132. For instance, a first electrode may be made more positive than a second electrode by applying a positive voltage to the first and grounding the second.

In some cases, each droplet covers multiple electrodes (and the droplets maintain sufficient distance, center-to-center, to remain separate). In this scenario, again, the droplets may be actuated to move forward, one droplet at a time, in a temporal sequence, in a manner loosely analogous to a "shift register". For instance, the "leader" droplet (in the front of the single file) may be caused to move forward by applying (to an electrode that is in front of the leader droplet or that touches the front of the leader droplet), a voltage that is more positive than the voltage of electrodes underneath the center and rear of the leader droplet. After the leader droplet has moved forward, the next droplet in the single file may be actuated to move forward in a similar manner. Thus, all the droplets in the single file may move forward, one droplet at a time, in a temporal sequence. Again, a first electrode may be made more positive than a second electrode by applying a positive voltage to the first and grounding the second.

FIGS. 12A, 12B, and 12C show droplets shifting position in a 2D "shift register" or "shift array". FIGS. 12A-12C are in temporal sequence; FIGS. 12A and 12C being the first and last, respectively, in the sequence.

In FIGS. 12A-12C, rows of droplets (e.g., rows 1201, 1202, 1203, 1204, 1205, 1206, 1207, 1208) move in a single direction 1210 across an EWOD plate 1220 that includes a 2D array of electrodes. In FIGS. 12A-12C, the droplets are actuated to shift forward by changing voltage applied to the electrodes.

In some cases, the droplets are sufficiently small that each droplet covers all or part of only one electrode, as shown in FIGS. 12A-12C. In this scenario, rows of droplets may be actuated to move forward, one row of droplets at a time, in a temporal sequence, in a manner loosely analogous to a 2D "shift register". For example, in FIG. 12A, droplet rows 1201, 1202, 1203 may be actuated to move forward as follows: (a) first, make electrode row 1230 more positive than electrode row 1231, thereby causing a first row of droplets 1201 to move from electrode row 1231 to electrode row 1230; (b) second, make electrode row 1231 more positive than electrode row 1232, thereby causing a second row of droplets 1202 to move from electrode row 1232 to electrode row 1231; and (c) third, make electrode row 1232 more positive than electrode row 1233, thereby causing a third row of droplets 1203 to move from electrode row 1233 to electrode row 1232. For instance, a first electrode row may be made more positive than a second electrode row by applying a positive voltage to the first and grounding the second.

Likewise, a 2D "shift register" may be implemented where each droplet covers multiple electrodes (and the droplets maintain sufficient distance, center-to-center, to remain separate). Again, in this scenario, rows of droplets may be actuated to move forward, one row of droplets at a time, in a temporal sequence, in a manner loosely analogous to a 2D "shift register". For instance, by turning rows of electrodes positive, one row of electrodes at a time, rows of droplets may be actuated to move forward, one row of droplets at a time.

FIGS. 13A, 13B, 13C, and 13D show droplets being mixed, before being moved into position on an EWOD plate. FIGS. 13A-13D are in temporal sequence, with FIGS. 13A and 13D being the first and last, respectively, in the sequence.

In FIGS. 13A-13D, 14 and 15: (a) paths 1305, 1307, 1405, 1407, 1470, 1471 are each, respectively, a narrow EWOD plate that comprises a substrate, electrode layer, dielectric layer and hydrophobic layer; and (b) likewise, plates 1310, 1410 are each, respectively, an EWOD plate that comprises a substrate, electrode layer, dielectric layer and hydrophobic layer. Paths 1307, 1405, 1407, 1470, 1471 are narrow: they each include only a single row or column of electrodes or only a single bent line of electrodes. In contrast, plates 1310, 1410 each include a 2D array of electrodes, including multiple rows and columns of electrodes.

In FIG. 13A: (a) droplet 1301 is centered above electrode 1331 on path 1305; and (b) droplet 1303 is centered above electrode 1333 on path 1307.

In FIG. 13B, droplet 1301 has been moved so that droplet 1301 is centered above electrode 1332.

In FIG. 13C, droplet 1303 has been moved so that droplet 1303 is centered above electrode 1334.

In FIG. 13D, droplets 1301 and 1303 have merged to form droplet 1304.

The contents of droplets 1301 and 1303 are mixed together in droplet 1304. Droplet 1304 may then be moved into position on plate 1310.

FIG. 14 shows droplets being moved into position under an EWOD plate and then deposited to form a 3D object. In FIG. 14, the droplets are being moved directly or indirectly toward plate 1410. For instance, droplets 1421 and 1422 are being moved along path 1407 toward electrode 1460, and then may be moved along path 1405 toward plate 1410. Likewise, droplets 1411, 1412, 1423 are being moved along path 1405 toward plate 1410.

In FIG. 14: (a) droplets 1421, 1422, 1423 may be from a first reservoir and may comprise a first material; and (b) droplets 1411, 1412 may be from a second reservoir and may comprise a second material.

At the moment of time shown in FIG. 14, droplets (e.g., 1411, 1412, 1421, 1422, 1423, 1430) are attracted to, and touch the bottom surface of, an EWOD plate (e.g., 1405, 1407, 1410). (Recall that paths 1405, 1407 are narrow EWOD plates). This attraction, which holds the droplets against the bottom of plates 1405, 1407, 1410, is due to voltages applied to electrodes or other electrical nodes in these plates.

After the moment of time shown in FIG. 14, positive voltages in one or more electrodes in EWOD plate 1410 may be turned off (e.g., by grounding). This in turn may cause a group of droplets (which touch the bottom of plate 1410 at the moment of time shown in FIG. 14) to be released from the plate and to be deposited on 3D object 1440. For instance: (a) all or some of the electrodes in plate 1410 may be grounded simultaneously; and (b) the group of droplets that are released may comprise all or some of the droplets 1430 that are underneath (and touching the bottom surface of) plate 1410 in FIG. 14. For example, the released droplets may comprise all of the droplets that are (immediately before the release) underneath and touching the plate and may comprise a single layer of droplets. The droplets may—while they are still touching the plate and immediately before being released from the plate—also be touching 3D object 1440 that is being fabricated. Or the droplets may, after being released, fall a short distance before physically contacting 3D object 1440.

In FIGS. 14 and 15, a 3D object (1440) comprises layers (e.g., 1451, 1452, 1453) formed by deposition of droplets. For instance, one or more of the layers in 3D object 1440 may be a material (e.g., a composite material) that includes one or more of the following: (a) polymers; (b) cells or cell fragments; (c) tissue; (d) single-cell or multi-cell organisms, including bacteria or fungi; (e) viruses; (f) chemokines; (g) hydrogel (e.g., PV-based gels; (h) alginate, (i) biomaterial; (j) bioactive or bioengineered material; (k) nutrients; (l) matrix material; (m) scaffold material; (n) resin; (o) curing agent; or (p) any inorganic, organic or bioactive material. The materials in object 1440 may be included in the deposited droplets, or may be produced by chemical or biochemical reactions that involve materials that are included in the deposited droplets.

In FIGS. 14-21, droplets may solidify or cure after (or while or before) being deposited by an EWOD plate.

For instance, the droplets may include a photopolymer that is cured by exposure to light (e.g., ultraviolet light) after being released from an EWOD plate (e.g., 1410, 1761, 2063). For instance, UV light may cure the photopolymer after the droplets have been deposited on a build platform (e.g., 1490, 1780, 2080) or on a 3D object (e.g., 1440) being fabricated on a build platform.

Alternatively, the droplets may include a resin (e.g., a thermosetting resin) and a curing agent that causes the resin to polymerize. The resin and curing agent may be in separate droplets that mix after leaving an EWOD plate (e.g., 1410, 1761, 2063). For instance, the resin and curing agent may mix while or after impacting a build platform (e.g., 1490, 1780, 2080) or while or after impacting a 3D object (e.g., 1440) being fabricated on the build platform. Or, the resin and curing agent may be mixed by merging droplets while they are touching an EWOD plate, and the merged droplets may then be quickly released from the plate. In some cases, the resin may comprise polyurethane resin, epoxy resin, polyester resin, unsaturated polyester resin, acrylic resin or silicone resin. The polymerization of the resin (triggered by the curing agent) may occur at room temperature and normal pressure (e.g., at a standard atmosphere of pressure). The curing agent may comprise a source of free radicals that initiates a free-radical chemical chain reaction polymerization. Or, the curing agent may comprise a polymer and the product that results from curing may comprise a copolymer.

FIG. 15 illustrates moving an EWOD plate. In FIG. 15, droplets are moved into position on top of an EWOD plate. Then, the plate: (a) is moved to a new position over a build platform; and (b) is turned over, so that the droplets are underneath (and touching) the EWOD plate. Then the droplets are released from the EWOD plate (e.g., by grounding electrodes in the plate). The released droplets are deposited on a build platform (or on a 3D object that is being fabricated on the build platform).

In FIG. 15: (a) droplets 1430 may be held substantially stationary relative to EWOD plate 1410: (a) while plate 1410 is being turned over; and (b) for a period of time after plate 1410 is turned over. This (holding a droplet in place relative to the EWOD plate) may be achieved by applying positive voltage to one or more electrodes that are near the droplet. For instance, a droplet may be centered over (or under) an electrode, and a positive voltage may be applied to the electrode.

In FIG. 15, EWOD plate 1410 is initially located at position 1491. While EWOD plate 1410 is located at position 1491, droplets 1430 are moved (by EWOD actuation) onto plate 1410 via paths 1470, 1471 and arranged in rows and columns on top of EWOD plate 1410. For instance, droplets that are transported to plate 1410 via paths 1470 and 1471 may be from a first reservoir and a second reservoir, respectively, and may contain different materials.

In FIG. 15, EWOD plate 1410 is then moved into a new position 1492 that is above build platform 1490. For instance, this movement 1480 of plate 1410: (a) may include a translation that includes both vertical and horizontal components; and (b) may also involve turning plate 1410 over (while droplets 1430 continue to touch plate 1410 and remain in substantially the same position relative to plate 1430). In FIG. 15: (a) a top surface of plate 1410 before the plate is turned over becomes a bottom surface of plate 1410 after the plate is turned over; and (b) droplets 1430 are on top of (and touching) plate 1410 when it is in position 1491 and then are below (and touching) plate 1410 when it is in position 1492. Alternatively, in some cases: (a) droplets 1430 are below (and touching) plate 1410 while it is in both positions 1491 and 1492; and (b) movement 1480 of plate 1410 does not involve turning over plate 1410.

In some cases, during movement 1480: (a) plate 1410 moves; but (b) paths 1470, 1471 remain stationary. For instance, paths 1470 and 471 may (during movement 1480) remain stationary relative to object 1440 and relative to build platform 1490.

Alternatively, in some cases, paths 1470 and 1471 move together with plate 1410 during movement 1480. For instance, paths 1470 and 1471 may remain stationary relative to plate 1410 during movement 1480.

In FIG. 15, actuator 1483 actuates movement 1480 of plate 1410. In some cases, actuator 1483 comprises a robot.

In FIG. 15, after EWOD plate 1410 is in position 1492: (a) electrodes in plate 1410 may be grounded; and (b) then droplets that are beneath (and touching) plate 1410 may fall (e.g., due to gravity) in a downward direction, away from plate 1410 and toward build platform 1490. Alternately, the droplets may, when they are released, already be touching 3D object 1440. In either case, the released droplets may be deposited: (a) on build platform 1490; or (b) on 3D object 1440 which is being fabricated on build platform 1490.

Figure 16A:
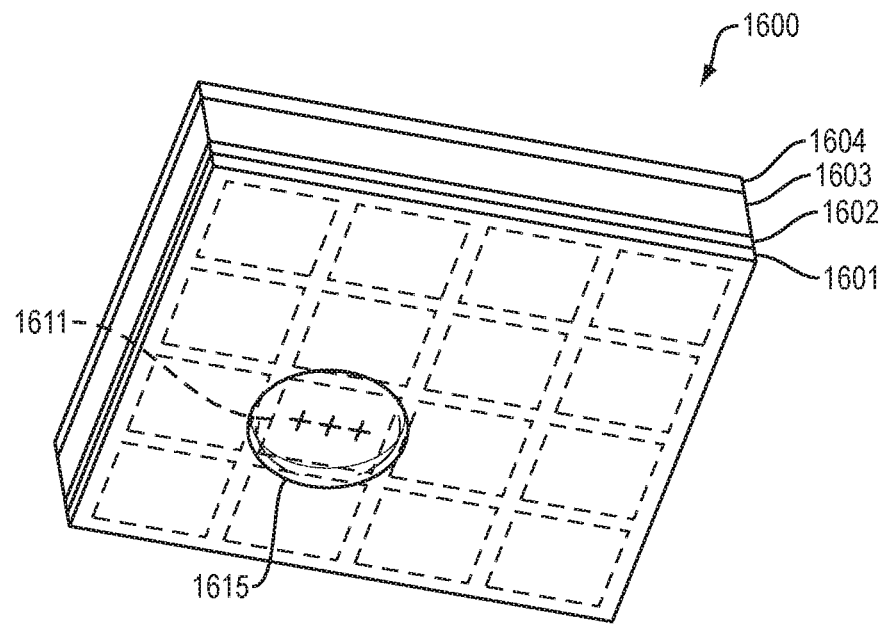
FIGS. 16A and 16B show movement of a droplet that is beneath, and touching, an EWOD plate.
Figure 16B:
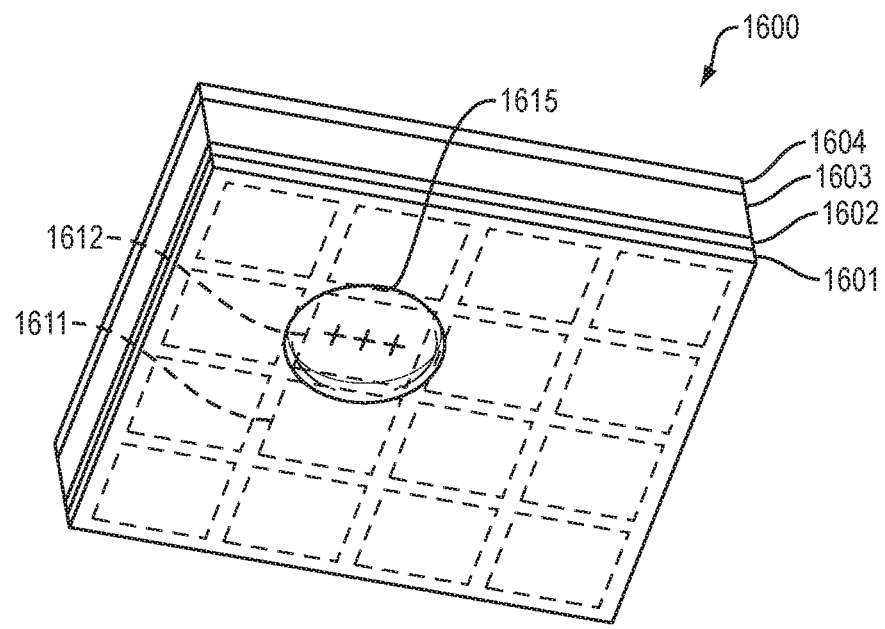

FIGS. 16A and 16B show movement of a droplet that is beneath, and touching, an EWOD plate. In FIGS. 16A and 16B, droplet 1615 is below an EWOD plate 1600. The EWOD plate 1600 includes a substrate layer 1604, electrode layer 1603, dielectric layer 1602 and hydrophobic layer 1601. In FIGS. 16A and 16B, droplet 1615 is touching hydrophobic layer 1601.

In FIG. 16A, droplet 1615 is centered under electrode 1611 (which has a positive voltage). In FIG. 16A, the other electrodes in plate 1600 are grounded.

FIG. 16B shows droplet 1615 after it has moved to a new position, in response to a change in voltage. Specifically: (a) electrode 1611 had a positive voltage in FIG. 16A and is grounded in FIG. 16B; and (b) electrode 1612 was grounded in FIG. 16A and has a positive voltage in FIG. 16B. In FIG. 16B, droplet 1615 has moved so that it is now centered under electrode 1612. In FIG. 16B, all of the electrodes in plate 1600 are grounded, except for electrode 1612 which has a positive voltage.

Figure 17:
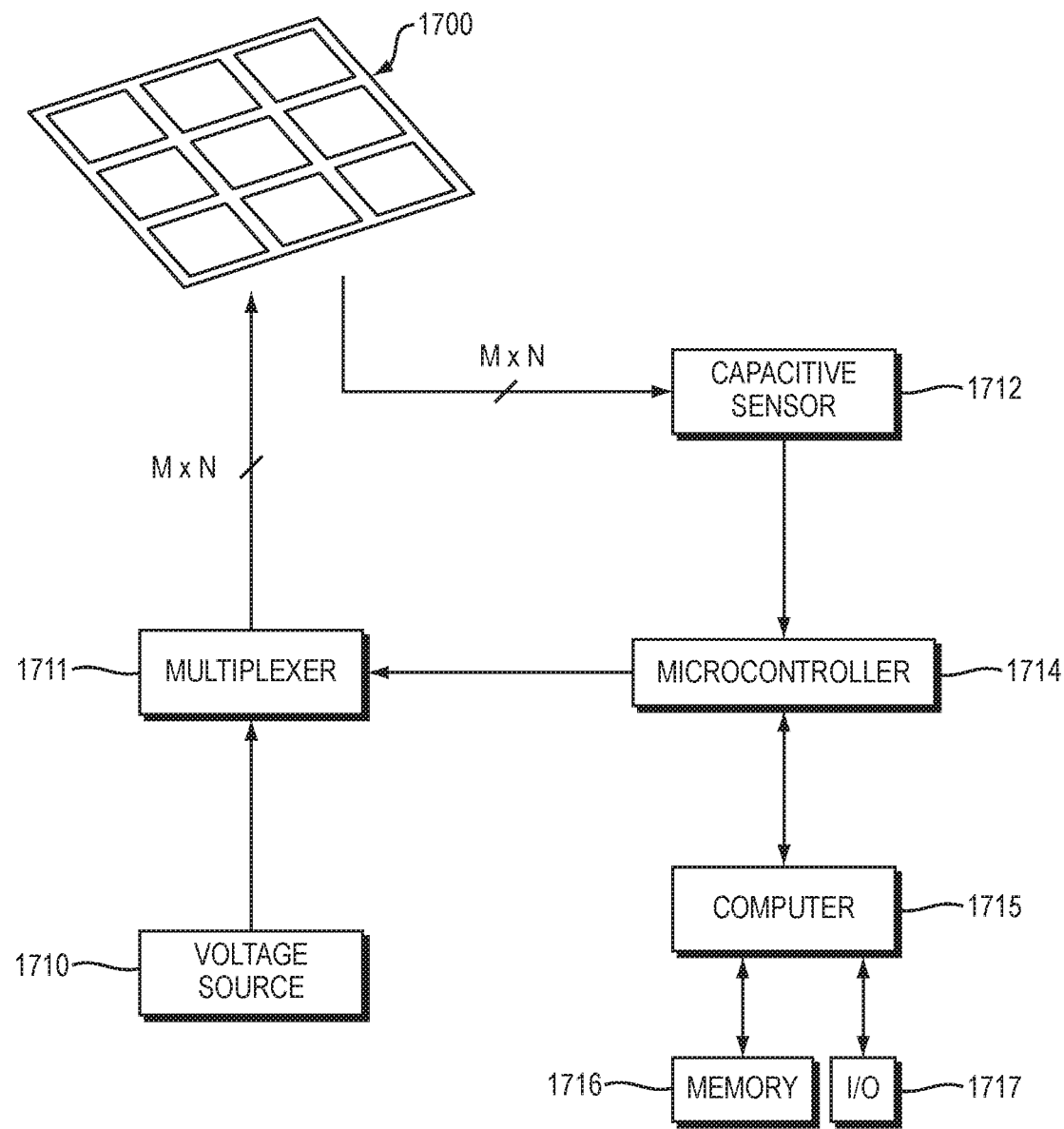
FIGS. 17 and 18 each show a system for controlling droplets and capacitively sensing their positions.
Figure 18:
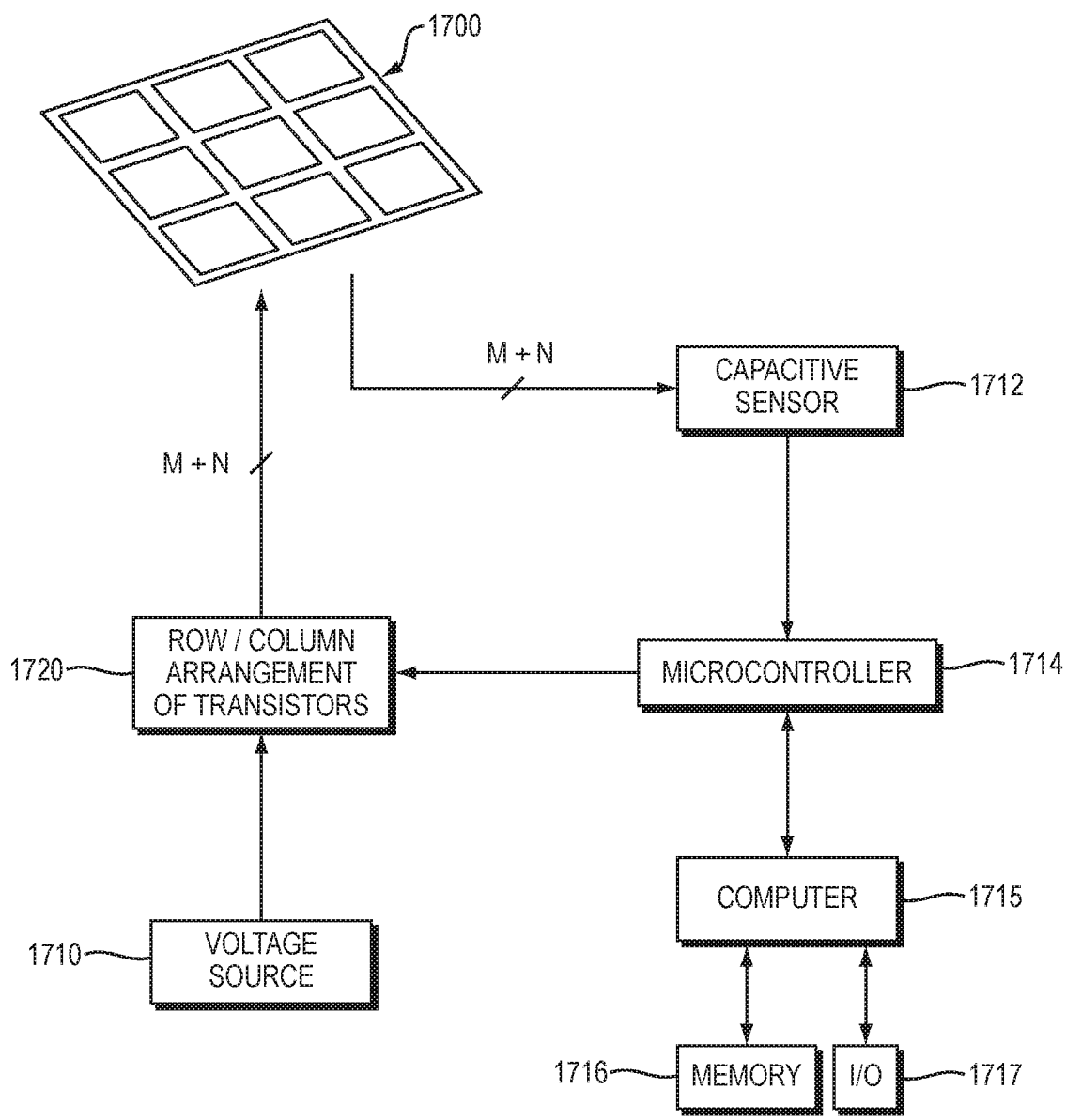

FIGS. 17 and 18 each show a system for controlling droplets and capacitively sensing their positions.

FIG. 19 shows a fabrication system that includes an EWOD plate.

In FIGS. 17, 18, 19, and 21, an EWOD plate (e.g., 1700, 1761) may include an array of M rows and N columns of electrodes. Voltage of the M×N electrodes in the EWOD plate (e.g., 1700, 1761) may be individually controlled, electrode by electrode, by controlling voltage from voltage source 1710 via a multiplexer 1711 or via a row/column arrangement of transistors 1720. Voltage source 1710 may output a high voltage (e.g., 275 V). Furthermore, multiplexer 1711 or transistors 1720 may be configured to operate at high voltage levels (e.g., 275 V). Microcontroller 1714 may receive data from capacitive sensor 1712 and may control multiplexer 1711 (or control transistors 1720). Computer 1715 may interface with and control microcontroller 1714. Likewise, computer 1715 may interface with or control one or more I/O devices 1717. Computer 1715 may store data in, and retrieve data from, memory device 1716. The one or more I/O devices 1717 may receive input from a human and may output information to a human. For instance, I/O devices 1717 may include one or more of following: touch screen, electronic display screen, mouse, keyboard, digital stylus, microphone, speaker, and camera.

In FIG. 19, a droplet handler 1760 includes: (a) EWOD plate 1761; (b) paths 1771, 1772, 1773 (which are themselves narrow EWOD plates); and (c) vessels 1781, 1782, 1783 for storing liquids or other materials that are included in the droplets. For instance, vessels 1781, 1782, 1783 may comprise containers that store liquid. Droplets (e.g., 1764, 1765, 1766) may be moved from vessels 1781, 1782, 1783 to EWOD plate 1761 via paths 1771, 1772, 1773. The droplets may, while touching plate 1761, be merged with other droplets (e.g., in order to mix materials), be split into separate droplets, and be moved to different positions relative to plate 1761. The actions in the preceding two sentences may occur while the droplets are underneath (and touching) one or more of the EWOD plates (e.g., plate 1761 or paths 1771, 1772, 1773). The droplets may be attracted to positive electrodes in the EWOD plates (e.g., in plate 1761 or in paths 1771, 1772, 1773). The electrodes may create an electric field that is sufficiently strong: (a) to cause the droplets to press against the bottom side of an EWOD plate (e.g., plate 1761, path 1771, path 1772, path 1773); and (b) to actuate motion of the droplets. The positive electrodes have a voltage that is higher than that of nearby electrical nodes (e.g., higher than that of nearby grounded electrodes, or higher than that of other grounded circuit nodes).

In FIG. 19, after droplets 1767 are positioned in a desired pattern under (and touching) EWOD plate (e.g., 1761), the positive voltages on plate 1761 may be reduced sufficiently to cause the droplets to be released from the plate. The released droplets may be deposited on build platform 1780 or on all or a portion of a 3D object 1768 being fabricated. In FIG. 19, a first layer of droplets 1768 has already been deposited, to start fabrication of the 3D object.

In FIG. 19, actuator 1790 may actuate vertical motion of all or part of droplet handler 1760 (including EWOD plate 1761, paths 1771, 1772, 1773 and vessels 1781, 1782, 1783). In some cases: (a) build platform 1780 remains stationary; (b) each time that a layer of droplets is deposited, the vertical thickness of the object being fabricated increases; and (c) after each layer of droplets is deposited, actuator 1790 raises droplet handler 1760.

Alternatively, in FIG. 19, actuator 1790 may actuate vertical motion of build platform 1780. In some cases: (a) droplet handler 1760 (including EWOD plate 1761) remains stationary; (b) each time that a layer of droplets is deposited, the vertical thickness of the object being fabricated increases; and (c) after each layer of droplets is deposited, actuator 1790 lowers build platform 1780.

In FIG. 19, actuator 1790 may increase the vertical distance between droplet handler 1760 and build platform 1780 (e.g., by raising the former or lowering the latter). This may be done to ensure that droplet handler 1760 is above build platform 1780 and above the object being fabricated. In some cases, the increase in this vertical distance ensures that droplets which are touching the bottom of plate 1761 do not at the same time also touch build platform 1780 or the object being fabricated.

In FIG. 19, actuator 1790 may comprise a motor (e.g., a stepper motor or servo motor) 1791 and one or more actuator arms (e.g., 1792, 1793, 1794) for transmitting motion or force. Alternatively, actuator 1790 may be any other type of actuator.

Capacitive sensor 1712 may be configured to detect the location of droplets (e.g., droplets touching EWOD plate 1700, droplets touching EWOD plate 1761, or droplets touching the narrow EWOD plates that comprise paths 1771, 1772, 1773). Capacitive sensor 1712 may also be configured to detect other objects (e.g., a human finger) that touch an EWOD plate. Likewise, capacitive sensor 1712 may be configured to detect the location of a droplet that being touched by a human finger. In some cases (e.g., in FIG. 18), capacitive sensor 1712 is multiplexed.

Capacitive sensor 1712 may be configured to perform any type of capacitive sensing, including mutual capacitance sensing, self-capacitance sensing, transmit mode sensing, shunt mode sensing, and loading mode sensing. For instance, in a prototype of this invention, a Cypress® PSoC® capacitive sensing system is employed.

In some implementations of this invention, the electrodes in an EWOD plate alternate rapidly between providing a low-voltage, high-frequency electrical signal for capacitive sensing and a high-voltage, low-frequency electrical signal for droplet actuation and droplet shape control. For instance, in a prototype of this invention, the electrodes in the EWOD plate alternate rapidly (about 300 times per second) between providing: (a) a 3.3 V, approximately 200 KHz signal for capacitive sensing; and (b) a 275 V, approximately 1 KHz signal for droplet actuation and droplet shape control.

Figure 21:
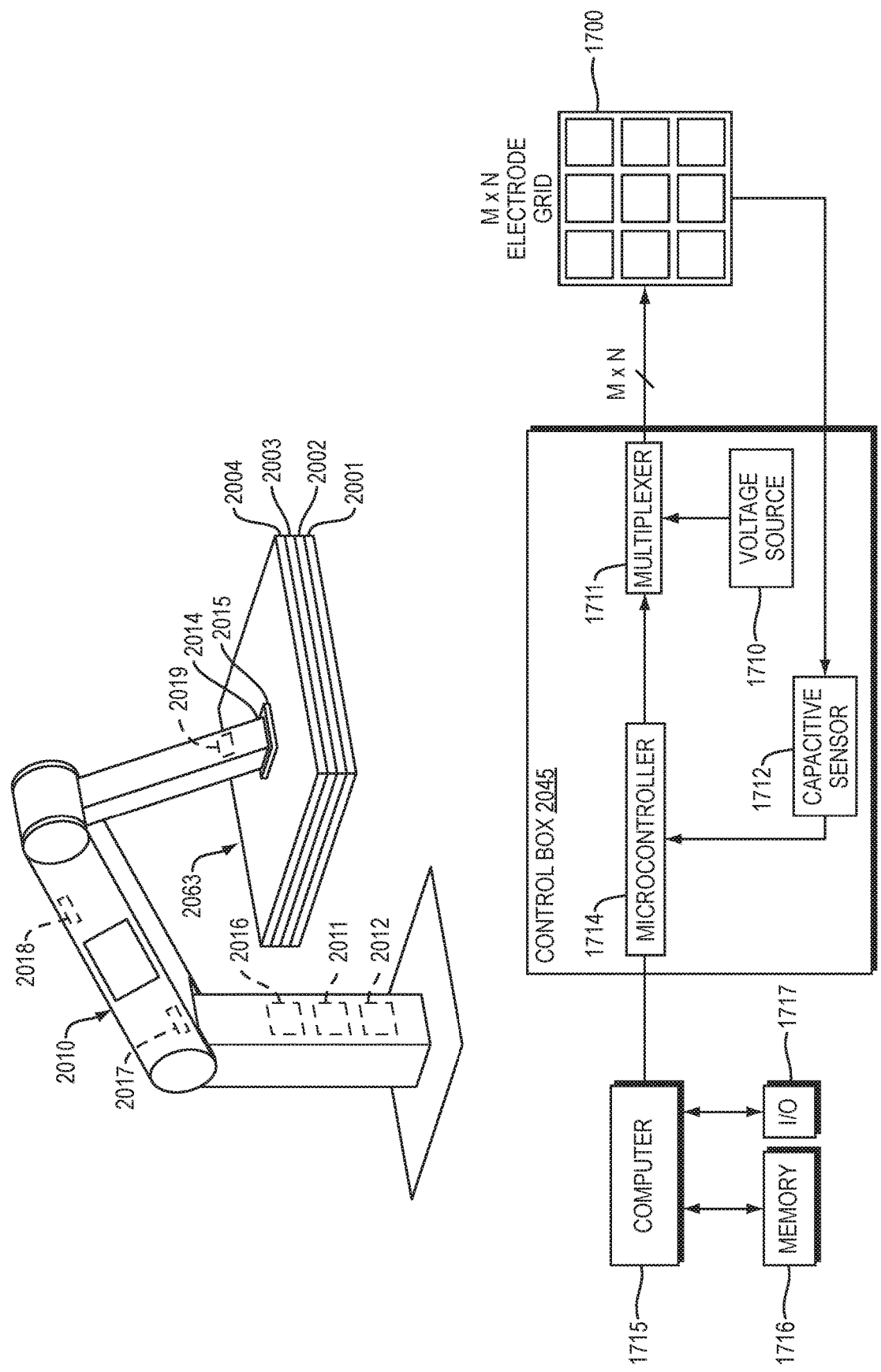

FIGS. 20 and 21 each show a fabrication system that includes a robotic arm that moves an EWOD plate.

In FIG. 20, droplets are being organized on or under multiple EWOD plates (e.g., 2073, 2074) simultaneously, in what may be loosely described as a "parallel" process. The organizing of the droplets may include (a) moving droplets into desired positions, and (b) merging and splitting of droplets. For each EWOD plate, respectively, there may be a separate set of vessels (e.g., 2081, 2082), each containing a different liquid or other material (e.g., cells). Droplets may be taken from these vessels (and, in some cases, merged with other droplets) in such a way as to control the type of liquid and other materials (e.g., cells) that are in each droplet, respectively. For each EWOD plate, respectively, there may be a separate set of paths for transporting droplets from the vessels to the plate. For instance, droplets 2071, 2072 may be transported via paths 2064, 2065 from vessels 2081, 2082 to EWOD plate 2073.

In FIG. 20, robotic arm 2010 picks up an EWOD plate 2063 and moves it into position over a build platform 2080 (or over a 3D object being fabricated on the build platform).

In the example shown in FIG. 20, robotic arm 2010 has picked up EWOD plate 2063 after droplets 2075 were organized into a desired pattern on (or under) EWOD plate 2063. At the moment shown in FIGS. 20 and 21, droplets 2075 are below (and touching) plate 2063. In some use scenarios: (a) droplets 2075 were initially on top of EWOD plate 2063; and (b) the robotic arm turned the plate over. Alternatively, in some use scenarios: (a) droplets 2075 were already under EWOD plate 2063; and (b) robotic arm did not turn the plate over.

Robotic arm 2010 may include hardware 2016 configured to apply controlled voltage to each electrode, respectively, in the EWOD plate that the robotic arm is then carrying (e.g., 2063). For example, hardware 2016 may include electrical connections to control box 2045 or may comprise another copy of control box 2045. Hardware 2016 may apply positive voltage to all or some of the electrodes in the EWOD plate that the robotic arm is then carrying and may ground (or otherwise apply a lower voltage) to other electrical nodes in the plate. By doing so, hardware 2016 may create electrical fields that are sufficiently strong to press droplets that are underneath the plate up against the plate, holding the droplets in place relative to the plate.

After robotic arm 2010 has moved an EWOD plate (e.g., 2063) to a position directly above build platform 2080 (or directly above an object being fabricated on the build platform), hardware 2016 may switch off the positive voltages in the electrodes in the plate (e.g., 2063). This in turn may cause the droplets (e.g., 2075) that were underneath (and touching) the plate to be released from the plate and to be deposited on the build platform 2080 or on an object being fabricated on the build platform.

After the robotic arm 2010 has caused droplets to be released from an EWOD plate, the robotic arm may move the plate back to its original position (or to another position where the plate may be loaded with drops again). Then: (a) the plate may be connected to paths (e.g., 2064, 2065) that transport droplets from vessels (e.g., 2081, 2082) to the plate; and (b) droplets may be organized on the plate again.

Robotic arm 2010 may include a connector 2015 that is located at an end 2014 of the robotic arm 2010. The connector 2015 may be configured: (a) to easily and repeatedly attach to, and be released from, an EWOD plate (e.g., plate 2063); or (b) to grasp, carry or otherwise support the weight of, an EWOD plate (e.g., plate 2063). Connector 2015 may comprise any type of connector, including: (a) any male or female part that is configured to attach to a female or male part of the plate; (b) any device that creates a vacuum, magnetic field, electric field or other force that causes the connector and plate to be pressed against each other; or (c) pincers or other device configured to grasp an object by applying pressure to (or by conforming its shape to) a surface of the object.

Robotic arm 2010 may include one or more actuators (e.g., 2012) that actuate movement of the robotic arm, in multiple degrees of freedom. Each of these actuators (e.g., 2012) may include a motor (e.g., a stepper motor or servo motor) and components for transmitting force or movement.

In addition, robotic arm 2010 may include one or more sensors (e.g., 2017, 2018, 2019) that sense position, movement, acceleration or orientation of parts of the robotic arm. For instance, sensors 2017, 2018, 2019 may include one or more accelerometers, gyroscopes, magnetometers and may include one or more position sensors (e.g., capacitive displacement sensor, inductive non-contact position sensor, linear variable displacement transducer, multi-axis displacement transducer, potentiometer, proximity sensor, optical proximity sensor, rotary encoder, or string potentiometer).

Robotic arm 2010 may also include microcontrollers (e.g. 2011) that control and interface with actuators 2012, sensors 2017, 2018, 2019, hardware 2016, and connector 2015.

In FIGS. 20 and 21, actuator 2090 may actuate vertical movement of build platform 2080. In some cases: (a) each time that a layer of droplets is deposited, the vertical thickness of the object being fabricated increases; and (b) after each layer of droplets is deposited, actuator 2090 lowers build platform 2080. Actuator 2090 may include a motor 2091 (e.g., a stepper motor or servo motor) and components (e.g., 2092, 2093, 2094) for transmitting force or movement.

Alternatively: (a) build platform 2080 may be stationary; (b) actuator 2090 may be omitted; and (c) robotic arm 2010 may lift the EWOD plate to a different height each time to compensate for increasing vertical thickness of the object being fabricated.

In FIGS. 15, 19, 20 and 21, actuators 1483, 1790, 2090, 2012 may comprise any type of actuator. For instance, actuators 1483, 1790, 2090, 2012 may each, respectively, comprise a linear, rotary, electrical, piezoelectric, electroactive polymer, mechanical or electro-mechanical actuator, or robot (e.g., robotic arm). In some cases, one or more of actuators 1483, 1790, 2090, 2012 include and are powered by an electrical motor, including any stepper motor or servomotor. In some cases, an actuator (e.g., 1483, 1790, 2090, 2012) includes a gear assembly, drive train, pivot, joint, rod, arm, or other component for transmitting motion. In some cases, one or more sensors are used to detect position, displacement or other data for feedback to an actuator (e.g., 1483, 1790, 2090, 2012). In FIGS. 15, 19, 20 and 21, actuators 1483, 1790, 2090, 2012 may each, respectively, comprise one or more actuators.

In FIG. 21, robotic arm 2010 is carrying EWOD plate 2063. This EWOD plate 2063 includes a substrate layer 2004, electrode layer 2003, dielectric layer 2002 and hydrophobic layer 2001. In FIG. 21, droplets (not shown) are underneath and touching hydrophobic layer 2001.

Figure 22C:
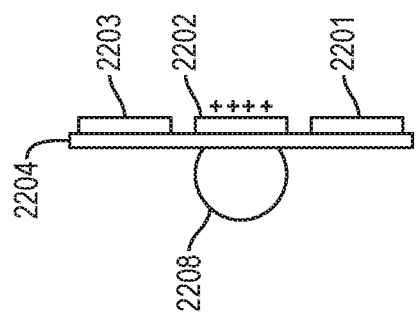
FIGS. 22A, 22B and 22C show vertical movement of a droplet.
Figure 22B:
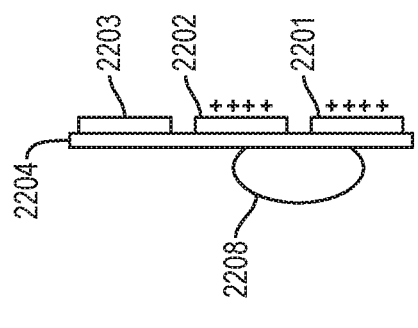
Figure 22A:
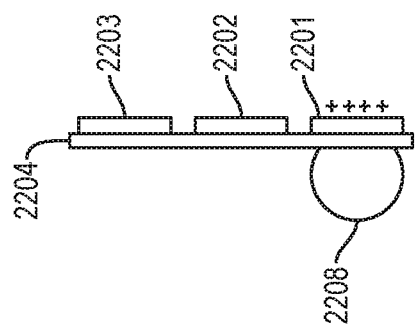

FIGS. 22A, 22B and 22C show vertical movement of a droplet. The change in location of the positive electrode(s) in these Figures causes droplet 2208 to translate vertically across surface 2204. FIGS. 22A-22C show a temporal sequence, with FIGS. 22A and 22C being the first and the last, respectively, in the sequence.

In FIG. 22A, electrode 2201 has a positive voltage and electrodes 2202, 2203 are grounded. This causes droplet 2208 to be centered adjacent to electrode 2201.

In FIG. 22B, electrodes 2201 and 2202 have a positive voltage and electrode 2203 is grounded. This causes droplet 2208 to spread out and to be centered between electrodes 2201 and 2202.

In FIG. 22C, electrode 2202 has a positive voltage and electrodes 2201 and 2203 are grounded. This causes droplet 2208 to be centered adjacent to electrode 2202.

The preceding discussion repeatedly mentions depositing a layer of droplets on a 3D object being fabricated. In each of these instances, the first layer of droplets: (a) may start the fabrication; and (b) may instead be deposited directly on a build platform or on an object (e.g., substrate) that is located on a build platform. The preceding discussion also mentions bringing a layer of droplets into contact with the top of a 3D object being fabricated. In each of these instances, the first layer of droplets: (a) may start the fabrication; and (b) may instead be brought directly into contact with a build platform or on an object (e.g., substrate) that is located on a build platform.

Prototype

The following six paragraphs describe a prototype of this invention.

In this prototype, an Arduino® microcontroller performs logic to generate drive signals for the electrodes and to process feedback obtained from the capacitive sensing unit.

In this prototype: (a) a DC source with flyback transformer is the primary high voltage supply; (b) high voltage 64 bit Serial-Parallel Shift registers drive the electrodes; and (c) for a thin Parafilm as a dielectric film (10 μm), the minimum actuation voltage employed is 90 V DC. Alternatively, an individual high voltage MOSFET may be employed to drive each individual electrode, respectively.

In this prototype, a capacitive sensor includes a Cypress® PSoC® 4 device. The capacitive sensor probes each electrode, respectively. To do so, the capacitive sensor scans each electrode at 3 kHz with a 16 bit resolution. In this prototype, the capacitive sensor is configured to detect, for each electrode, respectively: (a) a droplet touching the electrode; (b) a human finger touching the electrode; and (c) a human finger touching a droplet that touches the electrode. Data detected by the capacitive sensor is employed for feedback and error correction in droplet motion.

In this prototype, a GUI (graphical user interface) accepts human input that comprises instructions to control the motion (including path and speed) of droplets. The GUI communicates with an Arduino® over Serial protocol to exchange commands for actuation and to track the location of the droplets. The GUI includes a slider that sets the speed of motion of droplets. Droplets represented as circles on the GUI may be individually selected by clicking and then dragged to physically move them on an EWOD plate. Alternatively, the GUI may be implemented in such a way that multiple droplets may be controlled simultaneously.

In this prototype, the size of each electrode is 2.54 mm×2.54 mm, with a 100 micron gap between each electrode.

In a test of this prototype, 30 droplets of size 2.5 mm were simultaneously actuated on an EWOD plate that included 512 electrodes. In this prototype, to avoid accidental coalescing, droplets are separated from each other by at least one electrode.

The prototype described in the preceding six paragraphs is a non-limiting example of this invention. This invention may be implemented in many other ways.

Color Palette

In some implementations of this invention, an EWOD plate automatically mixes pigments to create or replenish a physical color palette. For example, an EWOD plate may mix pigments to create different colors of paint that an artist may employ when painting. In some cases: (a) droplets are at least 10 μl (e.g., 3 mm diameter) to interface well with a paintbrush; and (b) the size of each electrodes is at least 2.54 mm×2.54 mm to facilitate actuation of these relatively large droplets. An open single plate EWOD may facilitate direct interaction of a paintbrush (or other artist's tool) with the paints (colored droplets) on the EWOD plate.

In an illustrative use case: (a) an artist paints a flower with cyan and yellow colors; (b) a computer predicts that the stem of the flower is green, and the GUI proposes a green color: and (c) an EWOD plate automatically creates the green color by mixing droplets (e.g., by merging yellow and cyan droplets).

In illustrative implementations, an EWOD plate may simultaneously control the actuation of multiple droplets, in such a way as to control each droplet individually. This droplet-wise actuation of fluids on an EWOD plate may facilitate repetitive mixing of colored pigments. An EWOD plate may mix basic colors of pigments in such a way as to produce a range of different colors of droplets.

In some implementations, a camera captures images of a painting while an artist paints the painting. Based on these images, a computer may predict colors that an artist will use and output instructions that cause an EWOD plate to mix droplets to create paints with these colors. In some cases: (a) a camera captures a primary color of a real-world object; and (b) an EWOD plate may actuate a series of merging operations (in which droplets are merged) to automatically generate a gradient of the particular color.

More Details

In some implementations, a GUI (graphical user interface) displays information to a user and receives instructions from a user via input/output devices (e.g., I/O devices 1717). GUI software running on computer 1715 may communicate via a serial communication channel with the control box 2045 to locate and actuate the droplets. The GUI may accept input from a user that comprises instructions for actuating one or more droplets, including in such a way as to cause droplets to translate, merge, split and change shape. Furthermore, the GUI may accept input from a human that: (a) defines paths for droplets through way points; or (b) specifies high level droplet operations such as merge, split and spread. In some cases, the GUI facilitates multi-touch interaction for simultaneous interaction with many droplets, and receives touch and proximity input from capacitive sensors.

In some implementations, the EWOD plate actuates droplets in such a way that the droplets wet other materials. For instance, an EWOD plate may actuate droplets to cause the droplets to wet selective parts of an object at controlled times. Alternatively, an EWOD plate may actuate droplets in such a way that the droplets exert forces on external objects. Alternatively, the wetting of the droplet can induce a folding behavior in an thin films through capillary forces.

In many implementations, the EWOD plate is "open" in the sense that droplet actuated by the plate are not sandwiched between two plates but are instead touching only one plate at a time. In many use scenarios, there are strong practical advantages to using an "open" plate.

A first advantage is that deposition of droplets during 3D printing may be achieved by releasing droplets which are adhering (due to electrical fields) to the bottom side of an open EWOD plate. After being released, the droplets may be deposited on a 3D object that is being fabricated.

A second advantage is that an open EWOD plate may facilitate the addition of fluid to, or the removal of fluid from, the plate. For instance, droplets may (automatically or manually) be added to or removed from the plate with a pipette or needle tip dropletper. Or, droplets may be removed from the plate (automatically or manually) by wiping the plate with a wiper, paper or cloth.

A third advantage is that an open EWOD plate may facilitate direct physical interaction between a human user and droplets on the plate. For example, a human user may physically interact with a droplet on an open EWOD plate by: (a) touching the droplet; (b) tilting the plate; or (c) blowing on the droplet. Also, a human user may add a droplet to a single open EWOD plate, or remove it from the plate, as described in the preceding paragraph.

A fourth advantage is that an open-plate configuration may be better suited for handling large volume droplets than is a double-plate configuration. In a double-plate configuration, a droplet may be sandwiched between two plates (as discussed below). In a double-plate configuration, the shape of a droplet may approximate a cylindrical disc, with the flat edges of the disc touching the two plates. In contrast, in an open plate configuration, the shape of a curved surface of the droplet may approximate the shape of a portion of a sphere. Thus, for a given diameter of droplet, the volume of the droplet may be greater in an open-plate configuration than in a double-plate configuration.

In some cases, a double-plate configuration may be employed. For instance, a droplet may be sandwiched between two EWOD plates, where one plate is electrically grounded, and the other plate includes an array of the electrodes whose voltages may be controlled on an electrode-by-electrode basis. In some use scenarios, a double-plate configuration is advantageous. For example, in some cases, a double-plate configuration may: (a) move droplets vertically using less voltage than would an open plate; (b) split droplets reliably under various configurations; and (c) protect droplets from other elements. In some cases, in a double plate configuration, the top EWOD plate is transparent. For instance, a transparent top plate may be desirable if the movement of droplets sandwiched between the two EWOD plates is being used as a visual display.

In illustrative implementations of this invention, an EWOD plate may be planar or curved.

EWOD plates 200, 300, 900, and 1600 are each, respectively, an EWOD actuator (as defined herein). More generally, each EWOD plate discussed herein may comprise an EWOD actuator. In some implementations of this invention, an EWOD actuator includes one or more EWOD plates and also includes other hardware that: (a) is configured to modulate or control the modulation of voltage in the EWOD plate(s); or (b) is configured to capacitively sense objects which are touching an EWOD plate or which are touching droplets that are in physical contact with an EWOD plate. For instance: (a) all of the hardware shown in FIG. 17, taken together, may comprise an EWOD actuator; and (b) all of the hardware shown in FIG. 18, taken together, may comprise an EWOD actuator.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of an EWOD actuator or EWOD plate; (2) to modulate, or control the modulation of, voltage in electrodes; (3) to receive data from, control, or interface with one or more sensors; (4) to perform any other calculation, computation, program, algorithm, or computer function described or implied herein; (5) to receive signals indicative of human input; (6) to output signals for controlling transducers for outputting information in human perceivable format; (7) to process data, to perform computations, and to execute any algorithm or software; and (8) to control the read or write of data to and from memory devices (tasks 1-8 of this sentence referred to herein as the "Computer Tasks"). The one or more computers (e.g. 1714, 1715) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 1712, 1714, 1715) are configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 1714, 1715) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

A specific surface of an object may be a "bottom surface" of the object at a first time and a "top surface" of the object at a second time, due to the object being in different rotational position at the first time than at the second time.

To compute "based on" specified data means to perform a computation that takes the specified data as an input.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

A droplet is a non-limiting example of a "drop".

A "droplet" may comprise any liquid, including water, any aqueous solution, any polar liquid, or any polarizable liquid. The term "droplet" does not create any implication regarding size. A "droplet" may be of any size.

For an event to occur "during" a time period, it is not necessary that the event occur throughout the entire time period. For example, an event that occurs during only a portion of a given time period occurs "during" the given time period.

The term "e.g." means for example.

"EWOD" means electrowetting-on-dielectric.

"EWOD actuator" or "electrowetting-on-dielectric actuator" means an actuator that: (a) includes electrodes and a dielectric layer; and (b) is configured to actuate motion of droplets of liquid by modulating voltage in the electrodes and thereby creating a time-varying electric field that changes wetting of the droplets.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Ground" means an electrical ground. Non-limiting examples of a "ground" include an earth ground, a signal ground, and a chassis ground.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"1D" means one-dimensional.

The term "or" is inclusive, not exclusive. For example, A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"Positive electrode" means an electrode that has a positive voltage.

"Robot" means an actuator that is configured to be computer-controlled.

As used herein, the term "set" does not include a group with no elements.

Unless the context clearly indicates otherwise, "some" means one or more.

As used herein, a "subset" of a set consists of less than all of the elements of the set.

The term "such as" means for example.

"3D" means three-dimensional.

"2D" means two-dimensional.

To say that X is "time-varying" means that X changes over time.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is an apparatus comprising an electrowetting-on-dielectric (EWOD) actuator, wherein: (a) the EWOD actuator includes (i) an array of electrodes, and (ii) a dielectric layer; and (b) the EWOD actuator is configured to modulate voltage of each electrode in the array, respectively, in such a way that time-varying electric fields created by the electrodes cause drops of liquid (i) to undergo movement relative to the array, (ii) to press up against a bottom surface of the EWOD actuator while the drops are under and touching the bottom surface, and (iii) then to be released from the bottom surface. In some cases, the EWOD actuator is configured to cause the movement to occur while the drops are under and touching the bottom surface. In some cases, the EWOD actuator is configured to cause the movement to occur while the drops are above the EWOD actuator. In some cases, the apparatus includes a robot that is configured to actuate rotation of the EWOD actuator in such a way that a given surface of the EWOD actuator comprises a top surface of the EWOD actuator before the rotation and comprises the bottom surface after the rotation. In some cases, the EWOD actuator is configured to modulate voltage of each electrode in the array, respectively, in such a way that electric fields created by the electrodes cause the drops to touch and press against the actuator throughout the entire rotation. In some cases, the EWOD actuator is configured to cause at least a subset of the drops to move simultaneously. In some cases, the EWOD actuator is configured to cause an entire row of the drops or an entire column of the drops to move simultaneously during, and as part of, the movement. In some cases, the EWOD actuator is configured to repeatedly release layers of drops, one layer at a time, in such a way that the layers of drops fabricate an object. In some cases, the object comprises an electromechanical device. In some cases, the drops include cells or fragments of cells. In some cases: (a) the drops include a first drop and second drop; and (b) the first drop has a first material composition and the second drop has a second material composition, the first and second material compositions being different from each other. In some cases, the movement includes merging the first and second drops in such a way that the merging forms a larger drop. In some cases, the movement includes merging the first and second drops in such a way that the merging triggers a chemical reaction. In some cases, the array comprises electrodes arranged in rows and columns. In some cases, during the movement, at least one of the drops has a volume per drop that is greater than or equal to 10 picoliters and less than or equal to 100 picoliters. Each of the cases described above in this paragraph is an example of the apparatus described in the first sentence of this paragraph, and is also an example of an embodiment of this invention that may be combined with other embodiments of this invention.

In some implementations, this invention is an apparatus comprising a set of electrowetting-on-dielectric (EWOD) actuators, wherein: (a) the set of actuators includes multiple EWOD actuators; and (b) each specific EWOD actuator in the set (i) includes (A) an array of electrodes, and (B a dielectric layer, and (ii) is configured to modulate voltage of each electrode in the array, respectively, in such a way that time-varying electric fields created by the electrodes cause drops of liquid (A) to undergo movement relative to the array, (B) to press up against a bottom surface of the specific EWOD actuator while the drops are under and touching the bottom surface, and (C) then to be released from the bottom surface. In some cases: (a) the multiple EWOD actuators include an EWOD actuator and a second EWOD actuator; and (b) the first and second EWOD actuators move drops at the same time. In some cases, the apparatus: (a) includes a robot that is configured to carry the set of EWOD actuators, one EWOD actuator at a time, to a specific position; and (b) is configured to cause drops to be released from each particular EWOD actuator in the set, respectively, when the particular EWOD actuator is in the specific position. In some cases, the apparatus is configured to cause layers of drops to be released from the set of EWOD actuators, in such a way that: (a) one layer of drops is released at a time; and (b) each layer of drops, respectively, is released from only a single EWOD actuator in the set. In some cases, the apparatus is configured to position the EWOD actuators in such a way that drops released from the EWOD actuators fabricate an object. Each of the cases described above in this paragraph is an example of the apparatus described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described herein.

What is claimed:

1. An apparatus comprising an electrowetting-on-dielectric (EWOD) actuator, wherein:
    (a) the EWOD actuator includes
        (i) an array of electrodes, and
        (ii) a dielectric layer;
    (b) the EWOD actuator is configured to modulate voltage of each electrode in the array in such a way that time-varying electric fields created by the electrodes cause drops of liquid
        (i) to undergo movement relative to the array,
        (ii) to press up against a bottom surface of the EWOD actuator while the drops are under and touching the bottom surface, and
        (iii) then to be released from the bottom surface;
    (c) the EWOD actuator is configured to cause the movement to occur while the drops are above the EWOD actuator; and
    (d) the apparatus includes a robot that is configured to actuate rotation of the EWOD actuator in such a way that a given surface of the EWOD actuator comprises a top surface of the EWOD actuator before the rotation and comprises the bottom surface after the rotation.

2. The apparatus of claim 1, wherein the EWOD actuator is configured to modulate voltage of each electrode in the array, respectively, in such a way that electric fields created by the electrodes cause the drops to touch and press against the actuator throughout the entire rotation.

3. An apparatus comprising an electrowetting-on-dielectric (EWOD) actuator, wherein:
    (a) the EWOD actuator includes
        (i) an array of electrodes, and
        (ii) a dielectric layer;
    (b) the EWOD actuator is configured to modulate voltage of each electrode in the array in such a way that time-varying electric fields created by the electrodes cause drops of liquid
        (i) to undergo movement relative to the array,
        (ii) to press up against a bottom surface of the EWOD actuator while the drops are under and touching the bottom surface, and
        (iii) then to be released from the bottom surface; and
    (c) the EWOD actuator is configured to repeatedly release layers of drops, one layer at a time, in such a way that the layers of drops fabricate an object.

4. The apparatus of claim 3, wherein the object comprises an electromechanical device.

5. An apparatus comprising a set of electrowetting-on-dielectric (EWOD) actuators, wherein:
    (a) the set of actuators includes multiple EWOD actuators;
    (b) each specific EWOD actuator in the set
        (i) includes
            (A) an array of electrodes, and
            (B a dielectric layer, and (ii) is configured to modulate voltage of each electrode in the array in such a way that time-varying electric fields created by the electrodes cause drops of liquid
(A) to undergo movement relative to the array,
(B) to press up against a bottom surface of the specific EWOD actuator while the drops are under and touching the bottom surface, and
(C) then to be released from the bottom surface; and
(c) the apparatus
(i) includes a robot that is configured to carry the set of EWOD actuators, one EWOD actuator at a time, to a specific position, and
(ii) is configured to cause drops to be released from each particular EWOD actuator in the set, respectively, when the particular EWOD actuator is in the specific position.

6. An apparatus comprising a set of electrowetting-on-dielectric (EWOD) actuators, wherein:
(a) the set of actuators includes multiple EWOD actuators;
(b) each specific EWOD actuator in the set
(i) includes
(A) an array of electrodes, and
(B a dielectric layer, and
(ii) is configured to modulate voltage of each electrode in the array in such a way that time-varying electric fields created by the electrodes cause drops of liquid
(A) to undergo movement relative to the array,
(B) to press up against a bottom surface of the specific EWOD actuator while the drops are under and touching the bottom surface, and
(C) then to be released from the bottom surface; and
(c) the apparatus is configured to cause layers of drops to be released from the set of EWOD actuators, in such a way that
(i) one layer of drops is released at a time, and
(ii) each layer of drops, respectively, is released from only a single EWOD actuator in the set.

7. The apparatus of claim 6, wherein the apparatus is configured to position the EWOD actuators in such a way that drops released from the EWOD actuators fabricate an object.

* * * * *